(12) United States Patent
Kubota

(10) Patent No.: US 8,681,436 B2
(45) Date of Patent: Mar. 25, 2014

(54) IMAGING LENS, IMAGING DEVICE AND INFORMATION DEVICE

(75) Inventor: Takashi Kubota, Tokyo (JP)

(73) Assignee: Ricoh Company, Ltd., Tokyo (JP)

(\*) Notice: Subject to any disclaimer, the term of this patent is extended or adjusted under 35 U.S.C. 154(b) by 185 days.

(21) Appl. No.: 13/323,272

(22) Filed: Dec. 12, 2011

(65) Prior Publication Data
US 2012/0147485 A1 Jun. 14, 2012

(30) Foreign Application Priority Data
Dec. 13, 2010 (JP) .................. 2010-277550

(51) Int. Cl.
*G02B 9/06* (2006.01)

(52) U.S. Cl.
USPC .......................................... 359/794

(58) Field of Classification Search
USPC ............ 359/794, 754, 756, 761, 762
See application file for complete search history.

(56) References Cited

U.S. PATENT DOCUMENTS

| | | | |
|---|---|---|---|
| 4,934,797 A | 6/1990 | Hirakawa | |
| 5,233,474 A | 8/1993 | Hirakawa | |
| 5,625,497 A * | 4/1997 | Emomoto | ............... 359/751 |
| 7,411,746 B2 | 8/2008 | Kato et al. | |
| 8,018,663 B2 | 9/2011 | Ohashi et al. | |
| 2009/0086340 A1 * | 4/2009 | Sato | ........................... 359/794 |
| 2011/0128637 A1 | 6/2011 | Kubota | |

FOREIGN PATENT DOCUMENTS

| | | |
|---|---|---|
| JP | 8-152555 | 6/1996 |
| JP | 2942280 | 6/1999 |
| JP | 2991524 | 10/1999 |
| JP | 2000-19391 | 1/2000 |
| JP | 3392964 | 1/2003 |
| JP | 2007-225963 | 9/2007 |
| JP | 2007-333790 | 12/2007 |
| JP | 2010-39088 | 2/2010 |

OTHER PUBLICATIONS

U.S. Appl. No. 13/162,025, filed Jun. 16, 2011, Takashi Kubota, et al.
U.S. Appl. No. 13/167,368, filed Jun. 23, 2011, Kazuyasu Ohashi, et al.

\* cited by examiner

*Primary Examiner* — James Greece
(74) *Attorney, Agent, or Firm* — Oblon, Spivak, McClelland, Maier & Neustadt, L.L.P.

(57) ABSTRACT

An imaging lens includes an optical system having in order from an object side to an image side a first lens group having a positive refractive power and a second lens having a positive refractive power to image an optical image of an object, the first lens group and the second lens group being displaced in an extending amount different from one another to be focused on an object of a finite distance, the first lens group including a negative meniscus lens having a convex surface on the object side, a lens having a weak refractive power, and a lens having a positive refractive power, and the second lens group including four lenses or less or five lenses or less having at least one pair of a cemented lens.

21 Claims, 9 Drawing Sheets

IMAGING LENS, IMAGING DEVICE AND INFORMATION DEVICE

PRIORITY CLAIM

The present application is based on and claims priority from Japanese Patent Application No. 2010-277550, filed on Dec. 13, 2010, the disclosure of which is hereby incorporated by reference in its entirety.

BACKGROUND

1. Technical Field

The present invention relates to an improvement in a single focus imaging lens which is used as an imaging optical system in various camera including a silver salt camera, specifically, a digital camera, a video camera, a monitoring camera or the like, so as to image a subject image for imaging a still image or a moving image. The present invention also relates to an imaging lens suitable for an imaging device using an electronic imaging device such as a digital camera or a digital video camera, an imaging device such as a camera using such an imaging lens and an information device such as a personal digital assistant having an imaging function.

2. Description of the Related Art

In recent years, a digital still camera and a digital video camera has been in widespread use as an imaging device using an imaging element such as a CCD (charge-coupled device) and a CMOS (complementary metal-oxide semiconductor). A digital camera for use in the imaging of a still image is specifically in widespread use instead of a silver salt camera using a so-called silver salt film.

Since an imaging element for use in this type of imaging device includes a large number of pixels, a high optical performance is required for an imaging lens. Moreover, an imaging device has been increasingly downsized in view of its portability. An imaging device required in the market has a high performance and compactness. Furthermore, since an imaging speed required for photographing has increased, a brighter lens is required for an imaging lens.

It is preferable for a field angle of an imaging lens for a digital camera to be a wide angle that can easily perform photographing like a snapshot. A wide-angle lens corresponding to 28 mm in a focal length converted in a 35 mm photograph (Leica size) is desired.

A typical configuration of a single-focus wide-angle lens includes a retrofocus type lens, for example. This retrofocus type lens which can keep an exit pupil position away from an imaging surface has a principal point back of the entire lens system, so that an asymmetry property is increased by a refractive power arrangement, and the correction of a comatic aberration, distortion and a chromatic aberration of magnification becomes insufficient.

As an optical system having a wide angle, a retrofocus type optical system including a front group having a negative refractive power is known as described in Patent Document 1 (Japanese Patent Publication No. 2942280) and Patent Document 2 (Japanese Patent Publication No. 2991524)

As the optical system having a wide angle, a retrofocus type optical system including a front group having a positive refractive power is also known as described in Patent Document 3 (Japanese Patent Publication No. 3392964) and Patent Document 4 (Japanese Patent Application Publication No. 2010-39088).

Like these optical systems, it is desirable for a compact high performance optical system to include a first lens on the most object side (subject side) having a negative refractive power and to include the last lens having a positive refractive power. Moreover, it is necessary to reduce the number of lenses by using a cemented lens or the like so as to prevent the eccentricity of lenses.

The optical systems described in the above-descried Patent Documents 1-4 will be considered below. The optical system described in Patent Document 1 includes two lens groups of negative and positive, but its entire length is long. For this reason, the distortion is −3%. The optical system described in Patent Document 2 also includes negative and positive two lens groups having a small number of lenses, but its entire length is also long. For this reason, the field curvature remains. The optical system described in Patent Document 3 includes two positive lens groups, but the distortion is about −10%. The optical system described in Patent Document 4 also includes two positive lens groups, but the ratio of the imaging face to the entire length is large, so it is not sufficient for downsizing.

As described above, the optical systems described in Patent Documents 1, 2 are the optical systems each having two lens groups. However, the optical system of Patent Document 1 has a long entire length, resulting in −3% distortion. The optical system described in Patent Document 2 includes a small number of lenses, but its entire length is also long, so that the field curvature can not be sufficiently corrected. The optical system described in each of Patent Documents 3, 4 includes tow positive lens groups. However, the optical system described in Patent Document 3 includes about −10% distortion, which is insufficient for the correction of the aberration. The optical system described in Patent Document 4 has a large ratio of the imaging face to the entire length, so that it can not be sufficiently downsized.

SUMMARY

It is, therefore, an object of the present invention to provide a high-performance, small and bright imaging lens having two lens groups of positive and positive with a wide angle about 28 mm of 35 mm conversion and having a small aberration such as distortion, and a small and high-performance imaging device and an information device using such an imaging lens.

In order to achieve the above object, one embodiment of the present invention provides an imaging lens comprising an optical system including in order from an object side to an image side a first lens group having a positive refractive power and a second lens having a positive refractive power to image an optical image of an object, the first lens group and the second lens group being displaced in an extending amount different from one another to be focused on an object of a finite distance, the first lens group including a negative meniscus lens having a convex surface on the object side, a lens having a weak refractive power, and a lens having a positive refractive power, and the second lens group including four lenses or less or five lenses or less having at least one pair of a cemented lens, wherein a focal length F2 of a second lens from the object side in the first lens group, a focal length F of an entire lens system at infinity, an entire length L of the entire lens system at infinity and a maximum image height Y' satisfy the following conditional expressions $$5.0 < |f2/F| \quad [1]$$

$$3.5 < L/Y' < 4.5 \quad [2].$$

One embodiment of the present invention also provides an imaging lens comprising an optical system including in order from an object side to an image side a first lens group having a positive refractive power and a second lens group having a positive refractive power to image an optical image of an object, the first lens group and the second lens group being displaced in an extending amount different from one another to be focused on an object of a finite distance, the first lens group including on a most object side a negative meniscus lens having a convex surface on the object side, and the second lens group including two lenses having a negative refractive power, and two lenses or more having a positive refractive power, among these, a most object side lens in the second lens group is a positive lens having a convex surface on the object side and a most image side lens in the second lens group is a positive lens having a convex surface on the image side, wherein a focal length f5 of a second lens from the image side in the second lens group, but a focal length f5 of a cemented lens when the second lens is a cemented lens, a focal length f6 of the most image side lens in the second lens group, a focal length F of an entire lens system at infinity and a focal length F2 of the second lens group satisfy the following conditional expressions $$-2.8 < f5/f6 < -0.8 \quad [4]$$

$$1.0 < F2/F < 1.8 \quad [5].$$

One embodiment of the present invention also provides an imaging lens comprising an optical system including in order from an object side to an image side a first lens group having a positive refractive power and a second lens group having a positive refractive power to image an optical image of an object, the first lens group and the second lens group being displaced in an extending amount different from one another to be focused on an object of a finite distance, the first lens group including a negative meniscus lens having a convex surface on the object side, a lens having a weak refractive power and a lens having a positive refractive power, and the second lens group including five lenses or less having at least one pair of a cemented lens, a focal length f2 of a second lens from the object side in the first lens group, a focal length F of an entire lens system at infinity, a total length L of the entire lens system at infinity, a maximum image height Y', an air interval d11-2 between a most object side lens and a lens next to the most object side lens in the first lens group and an air interval d12-3 between the second lens from the object side in the first lens group and a lens next to the second lens satisfy the following conditional expressions $$2.5 < |f2/F| \quad [13]$$

$$3.5 < L/Y' < 4.5 \quad [14]$$

$$d1_{2\text{-}3}/d1_{1\text{-}2} < 3.5 \quad [15].$$

BRIEF DESCRIPTION OF THE DRAWINGS

The accompanying drawings are included to provide further understanding of the invention, and are incorporated in and constitute a part of this specification. The drawings illustrate embodiments of the invention and, together with the specification, serve to explain the principle of the invention.

FIG. 15A illustrates a state in which an imaging lens according to one embodiment of the present invention is collapsed in a body of the digital camera; FIG. 15B illustrates a state in which the imaging lens extends from the body of the digital camera.

DETAILED DESCRIPTION OF THE PREFERRED EMBODIMENTS

Figure 1:
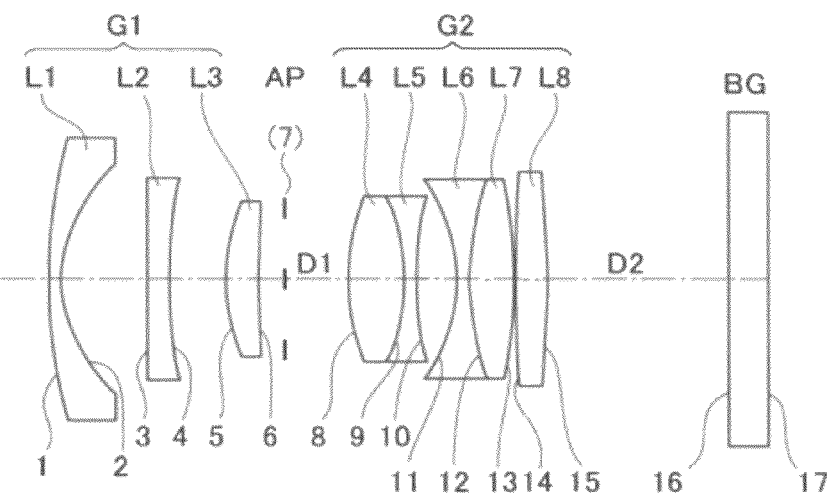
FIG. 1 provides a schematic sectional view illustrating a configuration of an optical system of an imaging lens in an optical axis according to Embodiment 1 of the present invention.

Hereinafter, an embodiment of an imaging lens, an imaging device and an information device will be described in detail with reference to the drawings. At first, a fundamental embodiment of the present invention will be described before describing specific embodiments including numerical values.

An imaging lens according to a first embodiment of the present invention constitutes an optical system including in order from an object side to an image side a first lens group having a positive refractive power and a second lens group having a positive refractive power, so as to image an optical image of an object. In focusing, the first and second lens groups are displaced in the extending amount different from one another to be focused on an object of a finite distance. The first lens group includes a negative meniscus lens having a convex surface on the object side, a lens having a weak refractive power, and a lens having a positive refractive power. The second lens group includes four lenses or less or five lenses or less having at least one pair of a cemented lens.

The focal length f2 of the second lens from the object side in the first lens group, the focal length F of the entire lens system at infinity, the entire length L of the entire lens system at infinity, and the maximum image height Y' satisfy the following conditional expressions (1)

$$5.0 < |f2/F| \quad [1]$$

$$3.5 < L/Y' < 4.5 \quad [2]$$

In order to obtain a high-performance imaging lens, the first lens group includes a negative meniscus lens, a lens having a positive refractive power and a lens having a weak refractive power. By this configuration, the aberrations are effectively corrected. Among these, the generation of the astigmatic difference can be effectively controlled. The second lens group includes at least one pair of a cemented lens, so that the axial chromatic aberration can be effectively corrected. In the after-described specific embodiments, for the purpose of back focusing, the second lens group includes a cemented lens and a positive lens or a cemented lens, a negative lens and positive lens. However, the combination of the lenses is not limited thereto because the aberrations can be corrected by using three lenses. If the conditional expression (1) is not satisfied, the astigmatic difference and the spherical aberration are increased.

In order to downsize the lenses and maintain the performance of the lenses with the two lens groups, it is desirable to satisfy the conditional expression (2) subject to satisfying the conditional expression (1).

In the imaging lens of the above-described first embodiment, an imaging lens according to a second embodiment of the present invention includes the air interval $d1_{1-2}$ between the most object side lens and the lens disposed next to that lens in the first lens group, and the air interval $d1_{2-3}$ between the second lens from the object side and the lens next to that lens in the first lens group which satisfy the following conditional expression (3).

$$0.4 < d1_{2-3}/d1_{1-2} < 3.5 \quad [3]$$

If the conditional expression (3) is not satisfied, the axial chromatic aberration due to the change in the lens interval is excessively corrected, and the comatic aberration is increased.

An imaging lens according to a third embodiment of the present invention constitutes an optical system including in order from an object side to an image side a first lens group having a positive refractive power and a second lens group having a positive refractive power so as to image an optical image of an object. In focusing, the first and second lens groups are displaced in the extending amount different from one another to be focused on an object in a finite distance. The first lens group includes on the most object side a negative meniscus lens having a convex surface on the object side. The second lens group includes two lenses having a negative refractive power and two lenses or more having a positive refractive power. Among these, the most object side lens in the second lens group is a positive lens having a convex surface on the object side and the most image side lens in the second lens group is a positive lens having a convex surface on the image side.

The focal length f5 of the second lens from the image side in the second lens group, but the focal length f5 of a cemented lens when the second lens is a cemented lens, the focal length f6 of the most image side lens in the second lens group, the focal length F of the entire lens system at infinity and the focal length F2 of the second lens group satisfy the following conditional expressions.

$$-2.8 < f5/f6 < -0.8 \quad [4]$$

$$1.0 < F2/F < 1.8 \quad [5].$$

In order to obtain a high performance imaging lens, the second lens group includes two lenses having a negative refractive power and two lenses or more having a positive refractive power. Among these, a positive lens having a convex surface on the image side is disposed on the most image side. By this configuration, the generation of a comatic aberration, an astigmatic difference, and field curvature can be effectively controlled. The conditional expression (4) is a conditional expression regarding the refractive power of the positive and negative lenses in the second lens group. By satisfying the conditional expression (4), the magnification chromatic aberration can be effectively maintained. If the parameter exceeds the upper limit of the conditional expression (4) or falls below the lower limit of the conditional expression (4), the magnification chromatic aberration is more likely to be increased. If the parameter considerably departs from the conditional expression (4), a large peripheral sagittal comatic aberration is generated. If the parameter falls below the lower limit of the conditional expression (5), a large axial chromatic aberration and a large magnification chromatic aberration are generated, and if the parameter exceeds the upper limit, the sagittal comatic aberration is more likely to be increased.

In any one of the imaging lens described in the first to third embodiments, an imaging lens according to a fourth embodiment of the present invention includes the distance L2 from the most object side surface to the most image side surface in the second lens group and the focal length F of the entire lens system at infinity which satisfy the following conditional expression (6).

$$0.4 < L2/F < 1.0 \quad [6]$$

If the parameter falls below the lower limit of the conditional expression (6), it becomes difficult to ensure the thickness of the center of the lens and the edge thickness of the lens and it also becomes difficult to correct aberrations. If the parameter exceeds the upper limit of the conditional expression (6), the entire length is increased, so that the entire length can not be reduced.

Moreover, as described above, in the imaging lens according to each of the first to fourth embodiments, the first and second lens groups are extended in the amount different from one another in focusing, so that the imaging lens can be focused on the object of a finite distance. Upon changing of the object distance, the first and second lens groups are extended in the amount different from one another, so that the displacement of the lens groups can be reduced, the field curvature due to the displacement of the lens groups can be corrected, the increase in the astigmatic difference can be controlled, and the entire lens can be reduced.

In any one of the imaging lenses in the above-described first to fourth embodiments, an imaging lens according to a fifth embodiment of the present invention includes the lens interval $D1_\infty$ between the first lens group and the second lens group when an object is at infinity, the lens interval $D1_t$ between the first lens group and the second lens group when the imaging lens is focused on the object of a finite distance, the interval $D2_\infty$ (back focusing at infinity) between the second lens group and the imaging surface when the object is at infinity, the interval $D2_t$ (back focusing in a finite distance) between the second lens group and the imaging surface when the imaging lens is focused on the object of a finite distance and the distance t from the most object side surface of the first lens group to the object when the object is in a finite distance, which satisfy the following conditional expression (7) with Log as a common logarithm.

$$-3.3 < \text{Log}|(D1_\infty - D1_t)/(D2_\infty - D2_t) \cdot t| < -2.7 \qquad [7]$$

If the parameter falls below the lower limit of the conditional expression (7), the displacement of the lens groups is reduced, so that the manufacturing error sensitivity of each group is increased. If the parameter exceeds the upper limit of the conditional expression (7), the displacement of each lens group is increased, so that it takes a long time for focusing.

In any one of the imaging lenses in the above-described first to fifth embodiments, an imaging lens according to a sixth embodiment of the present invention includes an aperture stop between the first lens group and the second lens group.

By providing the aperture stop between the first lens group and the second lens group, the generation of the pupil aberration can be controlled, and the extreme increase in the lens diameter of the first and second lens groups due to the front aperture stop and the back aperture stop can be prevented, so that a downsized high-performance imaging lens can be achieved.

In any one of the imaging lenses in the above-described first to sixth embodiments, an imaging lens according to a seventh embodiment of the present invention includes on the most object side a lens having a positive refractive power and the second lens from the object side having a negative refractive power in the second lens group.

The focal length $f4_1$ of the most object side lens in the second lens group and the focal length $f4_2$ of the second lens from the object side in the second lens group satisfy the following conditional expression (8).

$$-0.8 < f4_1/f4_2 < -0.5 \qquad [8]$$

If the parameter exceeds the upper limit of the conditional expression (8), the peripheral sagittal comatic aberration and the magnification chromatic aberration are more likely to be increased. If the parameter falls below the lower limit of the condition (8), the peripheral sagittal comatic aberration is more likely to be increased or the astigmatism and the astigmatic difference are more likely to be increased. The imaging lens according to the seventh embodiment includes a positive lens and a negative lens in order behind the aperture stop, so that aberrations are effectively controlled. In the after-described specific embodiments, a cemented lens having a positive lens and a negative lens is provided behind the aperture stop, but it is not limited thereto, and this cemented lens can be separated.

In any one of the imaging lenses in the above-described first to seventh embodiments, the imaging lens includes the curvature radius R2 of the image side surface of the most object side lens in the first lens group and the curvature radius R5 of the object side surface of the most image side positive lens in the first lens which satisfy the following conditional expression (9).

$$1.5 < |(R5-R2)/(R5-R2)| < 5.5 \qquad [9]$$

By maintaining the above conditional expression (9), the spherical aberration, the axial chromatic aberration, and the astigmatism are effectively corrected, so that a high-performance imaging lens can be achieved. If the parameter exceeds the upper limit of the conditional expression (9), the variation of the astigmatism is increased in a close object distance compared to an infinite object distance. If the parameter falls below the lower limit, a large axial chromatic aberration is more likely to be generated, and a large spherical aberration is more likely to be generated.

In any one of the imaging lenses in the above-described first to seventh embodiments, the imaging lens includes the curvature radius R8 of the image side surface of the most object side negative lens in the second lens group and the curvature radius R9 of the object side surface of the most image side negative lens in the second lens group which satisfy the following conditional expression (10).

$$|(R8+R9)/(R8-R9)| < 0.5 \qquad [10]$$

If the parameter exceeds the upper limit of the conditional expression (10), the axial chromatic aberration is more likely to be increased, and the spherical aberration is also more likely to be increased.

In any one of the imaging lenses in the above-described first to seventh embodiments, the imaging lens includes the focal length f1 of the most object side lens in the first lens group and the focal length f3 of the most image side lens in the first lens group, but the focal length f3 of a cemented lens when the most image side lens is a cemented lens which satisfy the following conditional expression (11).

$$-1.7 < f1/f3 < -0.5 \qquad [11]$$

If the parameter exceeds the upper limit of the conditional expression (11), the axial chromatic aberration is increased, and g-line and C-line are symmetrically increased in the d-line standard, and the peripheral sagittal comatic aberration is more likely to be increased. If the parameter falls below the lower limit of the conditional expression (11), a large axial chromatic aberration of g-line is generated, and the astigmatic difference is also increased.

In any one of the imaging lenses in the first to seventh embodiments, the imaging lens includes a convex shape on the surface of the most object side lens in the second lens group.

The curvature radius R6 of the image side surface of the most image side lens in the first lens group and the curvature radius R7 of the object side surface of the most object side lens in the second lens group satisfy the following conditional expression (12).

$$|(R6+R7)/(R6-R7)| < 1.7 \qquad [12]$$

By constituting as above, a high-performance imaging lens can be obtained. In addition, if the parameter exceeds the upper limit of the conditional expression (12), the spherical aberration is increased, and the astigmatic difference is more likely to be increased.

An imaging lens according to one embodiment of the present invention constitutes an optical system including in order from an object side to an image side a first lens group having a positive refractive power and a second lens group having a positive refractive power, so as to image an optical image of the object.

The first lens group and the second lens group are displaced in the extending amount different from one another to be focused on the object of a finite distance.

The first lens group includes a negative meniscus lens having a convex surface on the object side, a lens having a weak refractive power and a lens having a positive refractive power.

The second lens group includes five lenses having at least one pair of a cemented lens.

The focal length f2 of the second lens from the object side in the first lens group, the focal length F of the entire lens system at infinity, the entire length L of the entire lens system at infinity, the maximum image height Y', the air distance $d1_{1-2}$ between the most object side lens and the lens next to the most object side lens in the first lens group, and the air distance $d1_{2-3}$ between the second lens from the object side of the first lens group and the lens next to the second lens in the first lens group satisfy the following conditional expressions (13), (14), (15).

$$2.5 < |f2/F| \quad [13]$$

$$3.5 < L/Y' < 4.5 \quad [14]$$

$$d1_{2-3}/d1_{1-2} < 3.5 \quad [15]$$

In order to obtain a high-performance imaging lens, the first lens group includes the negative meniscus lens, the lens having a positive refractive power and the lens having a weak refractive power, so that aberrations can be effectively corrected, and the generation of the astigmatic difference can be specifically controlled. Since the second lens group includes at least one pair of a cemented lens, the axial chromatic aberration can be effectively corrected. In the after-described specific embodiments, for the purpose of the back focusing, the second lens group includes a cemented lens, a cemented lens and a positive lens or a cemented lens, a negative lens and a positive lens. However, another lens combination can be used as long as the second lens group uses three lenses because the aberrations can be corrected. If the conditional expression (13) is not satisfied, the astigmatic difference and spherical aberration are increased. Moreover, in order to downsize the lenses and maintain the performance of the lenses with the two lens groups, it is desirable to satisfy the conditional expression (2) subject to satisfying the conditional expression (14). If the conditional expression (15) is not satisfied, the axial chromatic aberration due to the change in the distance between lenses is more likely to be excessively corrected, so that the comatic aberration is increased.

An imaging device according to an eighth embodiment of the present invention includes any one of the imaging lenses in the above-described first to seventh embodiments.

By this configuration, a small and high-performance imaging device can be achieved.

An information device includes an imaging function and uses any one of the imaging lenses in the above first to seventh embodiments as an imaging optical system.

By this configuration, a small and high-performance information device can be achieved.

[Embodiment 1]

Next, specific embodiments (numerical embodiments) based on the above described embodiments will be described in details. The following Embodiments 1-7 are specific embodiments based on specific numerical embodiments of an imaging lens. The eighth embodiment is a specific embodiment of an imaging device or an information device using a lens unit including the imaging lens illustrated in Embodiments 1-7 as the optical system for imaging.

The aberrations of each imaging lens in Embodiments 1-7 are corrected at high level, and the spherical aberration, astigmatism, field curvature, and magnification chromatic aberration are sufficiently corrected. The distortion is 2.0% or below at an absolute value. By constituting an imaging lens as described in the following Embodiments 1-7, a preferable imaging performance can be ensured while having a wide angle about 38° of a half-field angle and a large diameter about 2.5 of F-number.

The meaning of signs which are common in Embodiments 1-7 are as follows.
F: focal length of entire optical system
Fno: F-number (numerical aperture)
R: curvature radius (paraxial curvature radius for aspheric surface)
D: surface interval
Nd: refractive index
vd: Abbe's number
ω: half-field angle An aspheric surface is defined by the following equation (13) where a shift in the optical axis direction in a position of a height H from the optical axis when an apex of a surface is standard is X, a constant of the cone is k, 4th, 6th, 8th and 10th . . . aspheric coefficients are C4, C6, C8, C10, and a paraxial curvature radius is R (c=1/R).

$$X = \frac{(CH^2/R)}{1+\{1-\sqrt{(k+1)C^2H^2}} + C4H^4 + C6H^6 + C8H^8 + C10H^{10} + \ldots \quad (13)$$

FIG. 1 provides a longitudinal sectional lens configuration in infinity focusing of an optical system of an imaging lens according to Embodiment 1.

As illustrated in FIG. 1, the optical system of the imaging lens according to Embodiment 1 includes in order from the object side to the image side a first lens L1, a second lens L2, a third lens L3, an optical aperture stop AP, a fourth lens L4, a fifth lens L5, a sixth lens L6, a seventh lens L7, an eighth lens L8 and a back insertion glass BG. This optical system of the imaging lens illustrated in FIG. 1 includes six groups having eight lenses in which the fourth lens L4 and the fifth lens L5 constitute a cemented lens and the sixth lens L6 and the seventh lens L7 constitute a cemented lens. The surface numbers of the optical surfaces are illustrated in FIG. 1. The reference numbers in FIG. 1 are independently used with respect to each example; thus, even if the common reference numbers are used in FIGS. 3, 5, 7, 9, 11, and 13, Embodiments corresponding to these figures are not always the common configurations.

The first lens L1 includes a negative refractive power, for example, a negative meniscus lens having a concave surface on the image side, and has an aspheric surface on the image side. The second lens L2 is a lens having a weak refractive power, for example, a biconcave lens having an aspheric surface on the image side. The third lens L3 is a lens having a positive refractive power, for example, a positive meniscus lens having a convex surface on the object side. The first lens L1, the second lens L2, and the third lens L3 constitute the first lens group G1.

The fourth lens L4 is a lens having a positive refractive power, for example, a biconvex lens. The fifth lens L5 is a lens having a negative refractive power, for example, a biconcave lens. These fourth and fifth lenses L4, L5 are cemented to form a cemented lens having the two lenses.

The sixth lens L6 is a lens having a negative refractive power, for example, a biconcave lens. The seventh lens L7 is a lens having a positive refractive power, for example, a biconvex lens. These sixth and seventh lenses L6, L7 are cemented to form a cemented lens having two lenses. The eighth lens L8 is a biconvex lens having a strong convex surface on the image side and having an aspheric surface on the image side. These fourth and fifth lenses (L4-L5 cemented lens), sixth and seventh lenses (L6-L7 cemented lens) and eighth lens constitute the second lens group G2.

The optical aperture stop AP is disposed between the first lens group G1 and the second lens group G2. The back insertion glass BG is arranged at the back of the second lens group G2. Like a digital camera, in an optical system using an imaging element such as a COMS or a CCD, at least one of a back insertion glass, a low pass filter, an infrared cut glass, and a cover glass which protects a light receiving surface of an imaging element is arranged at the back of the second lens group G2. In this case, the back insertion glass BG is arranged at the back of the second lens group G2. In each of Embodiments 1-7, the back insertion glass BG is illustrated as one plane parallel plate.

In focusing, the first lens group G1 having the first to third lenses L1-L3 and the second lens group G2 having the fourth to eighth lenses L4-L8 are moved to extend on the object side in the extending amount different from one another. The first lens group G1 and the second lens group G2 are supported by a support frame which is common to each group, and integrally move on a group to group basis in focusing. In this case, the optical aperture stop AP moves together with the first lens group G1.

In this Example 1, the focal length F of the entire system, the opening F-number Fno, and the half-field angle ω are F=14.6 mm, Fno=2.56, and ω=37.7°. The optical features such as the curvature radius (paraxial curvature radius for aspheric surface) R, the surface interval D between adjacent optical surfaces, the refractive index Nd, and the Abbe's number vd of the optical surface in each optical element in Example 1 are as shown in the following table.

TABLE 1

Optical Feature

| SURFACE NUMBER | R | D | Nd | vd | REMARK | |
|---|---|---|---|---|---|---|
| 1 | 39.103 | 0.8 | 1.49700 | 81.5 | L1 | G1 |
| 2* | 9.524 | 5.5 | | | | |
| 3 | −262.595 | 1.38 | 1.68893 | 31.1 | L2 | |
| 4* | 69.150 | 3.5 | | | | |
| 5 | 14.155 | 2.07 | 1.67790 | 54.9 | L3 | |
| 6 | 73.786 | 2.15 | | | | |
| 7 | INF | D1 | | | AP | |
| 8 | 16.176 | 3.60 | 1.88300 | 40.8 | L4 | G2 |
| 9 | −13.377 | 0.8 | 1.60342 | 38.0 | L5 | |
| 10 | 26.039 | 2.50 | | | | |
| 11 | −12.004 | 0.8 | 1.84666 | 23.8 | L6 | |
| 12 | 20.515 | 2.75 | 1.88300 | 40.8 | L7 | |
| 13 | −36.332 | 0.1 | | | | |
| 14 | 141.782 | 2.1 | 1.85400 | 40.4 | L8 | |
| 15* | −25.842 | D2 | | | | |
| 16 | INF | 3.2 | 1.51680 | 64.2 | BG | |
| 17 | INF | — | | | | |

In Table 1, a surface number with * (asterisk) denotes an aspheric surface and "INF" denotes infinity (∞). These are the same in Embodiments 2-7.

In Table 1, the second, fourth and fifteenth surfaces with * are aspheric surfaces, respectively, and the parameters of aspheric surfaces in the equation (13) are as follows.

Aspheric Surface Parameter

Aspheric surface coefficients of the image side surface (second surface) of the first lens L1 are as follows.

$K = -0.34743$ $C4 = -2.08681 \times 10^{-5}$ $C6 = -1.69782 \times 10^{-7}$ $C8 = -7.04729 \times 10^{-11}$ $C10 = -1.49113 \times 10^{-10}$ Aspheric surface coefficients of the image side surface (fourth surface) of the second lens L2 are as follows.

$K = 4.06374$ $C4 = 5.48721 \times 10^{-5}$ $C6 = 3.80669 \times 10^{-7}$ $C8 = 2.20602 \times 10^{-9}$ $C10 = 1.06877 \times 10^{-10}$ Aspheric surface coefficients of the image side surface (fifteenth surface) of the eighth lens L8 are as follows.

$K = 0.00000$ $C4 = 1.75662 \times 10^{-4}$ $C6 = -9.31395 \times 10^{-7}$ $C8 = 8.73748 \times 10^{-8}$ $C10 = -2.44583 \times 10^{-9}$ $C12 = 4.07148 \times 10^{-11}$ $C14 = -4.14957 \times 10^{-13}$ $C16 = 2.77210 \times 10^{-15}$ $C18 = -1.04607 \times 10^{-17}$ The variable interval D1 between the optical aperture stop AP and the fourth lens L4 and the variable interval D2 between the eighth lens L8 and the back insertion glass BG in Table 1 change as shown in the following Table 2 if the object distance changes to infinity and 250 mm.

TABLE 2

| Variable Interval | | |
|---|---|---|
| OBJECT DISTANCE | INFINITY | 250 mm |
| D1 | 3.58 | 3.30 |
| D2 | 11.91 | 13.34 |

The values corresponding to the above-described conditional expressions (1)-(12) in this Embodiment 1 are as follows.

$|f2/F| = 5.4$      [1]

$L/Y' = 4.13$      [2]

$d1_{2-3}/d1_{1-2} = 0.64$      [3]

$f5/f6=-0.94$ [4]

$F2/F=1.43$ [5]

$L2/F=0.87$ [6]

$\text{Log}|(D1_\infty-D1_t)/(D2_\infty-D2_t)\cdot t|=-3.10$ [7]

$f4_1/f4_2=-0.61$ [8]

$|(R5+R2)/(R5-R2)|=5.11$ [9]

$|(R8+R9)/(R8-R9)|=0.37$ [10]

$f1/f3=-1.00$ [11]

$|(R6+R7)/(R6-R7)|=0.51$ [12]

The values according to the conditional expressions (1)-(12) in this Embodiment 1 are within the ranges of the respective conditional expressions, and satisfy the conditional expressions (1)-(12), respectively.

Figure 2:
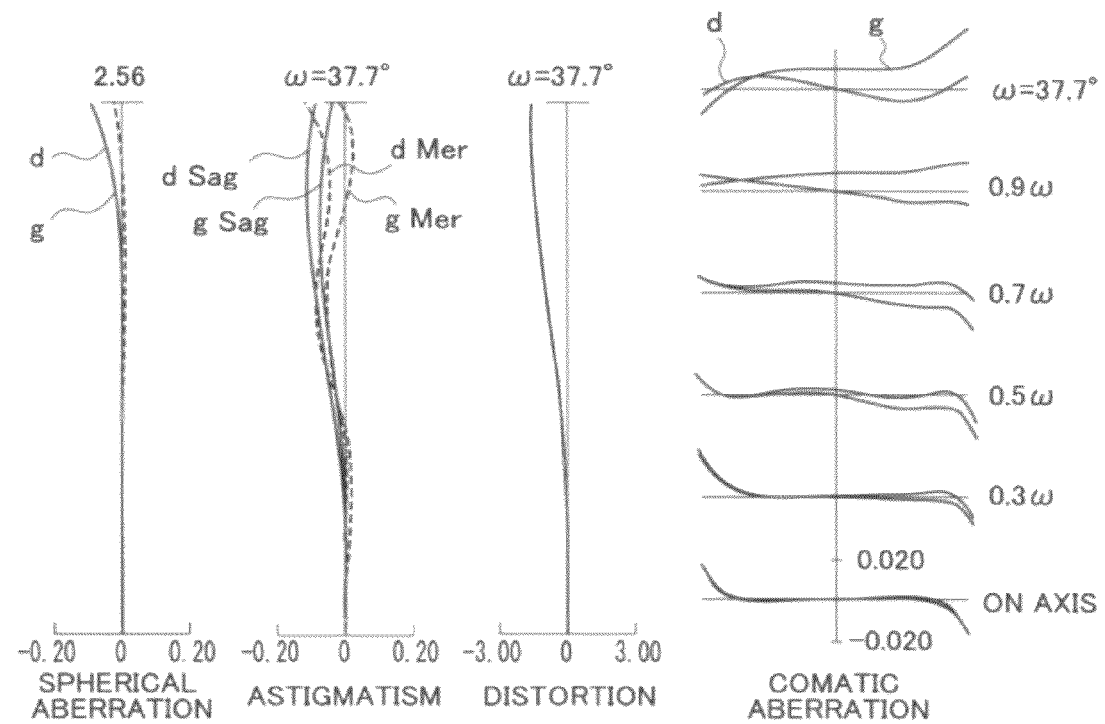
FIG. 2 provides aberration curves illustrating a spherical aberration, astigmatism, distortion and a comatic aberration in a state in which the imaging lens according to Embodiment 1 in FIG. 1 is focused on an infinity object.

FIG. 2 provides aberration curves of a spherical aberration, astigmatism, distortion, and a comatic aberration in a state in which the imaging lens according to Embodiment 1 is focused on an infinite object.

In the aberration curves, the dashed line in the spherical aberration illustrates a sine condition, the solid line in the astigmatism illustrates sagittal, and the dashed line in the astigmatism illustrates meridional. In each aberration curve, g and d illustrate g-line and d-line, respectively. These are the same as in the aberration curves according to another embodiment.

[Embodiment 2]

Figure 3:
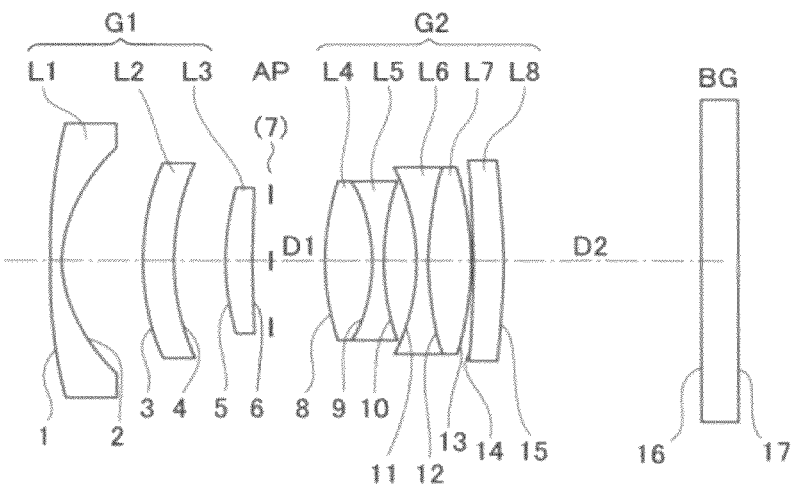
FIG. 3 provides a schematic sectional view illustrating a configuration of an optical system of an imaging lens in the optical axis according to Embodiment 2 of the present invention.

FIG. 3 provides a longitudinal sectional lens configuration in infinity focusing of an optical system of an imaging lens according to Embodiment 2.

The optical system of the imaging lens according to Embodiment 2 of the present invention includes in order from the object side to the image side a first lens L1, a second lens L2, a third lens L3, an optical aperture stop AP, a fourth lens L4, a fifth lens L5, a sixth lens L6, a seventh lens L7, an eighth lens L8, and a back insertion glass BG as illustrated in FIG. 3. This optical system includes six groups having eight lenses in which the fourth and fifth lenses L4, L5 constitute a cemented lens and the sixth and seventh lenses L6, L7 constitute a cemented lens. The surface numbers of the respective optical surfaces are illustrated in FIG. 3. As described above, the reference numbers in FIG. 3 are independently used with respect to each example; thus, even if the common reference numbers are used in FIGS. 1, 5, 7, 9, 11, and 13, Embodiments corresponding to these figures are not always the common configurations.

The first lens L1 includes a negative refractive power, for example, a negative meniscus lens having a concave surface and an aspheric surface on the image side. The second lens L2 is a lens having a weak refractive power, for example, a negative meniscus lens having an aspheric surface on the image side. The third lens L3 is a lens having a positive refractive power, for example, a plane-convex lens having a convex surface on the object side. The first, second and third lenses L1, L2, L3 constitute the first lens group G1.

The fourth lens L4 is a lens having a positive refractive power, for example, a biconvex lens. The fifth lens L5 is a lens having a negative refractive power, for example, a biconcave lens. The fourth and fifth lenses L4, L5 are cemented to form a cemented lens having two lenses.

The sixth lens L6 is a lens having a negative refractive power, for example, a biconcave lens. The seventh lens is a lens having a positive refractive power, for example, a biconvex lens. These sixth and seventh lenses L6, L7 are cemented to form a cemented lens having two lenses. The eighth lens L8 is a positive meniscus lens having a convex surface and an aspheric surface on the image side. These fourth and fifth lenses L4, L5 (L4-L5 cemented lens), the sixth and seventh lenses L6, L7 (L6-L7 cemented lens) and the eighth lens L8 constitute the second lens group G2.

The optical aperture stop AP is arranged between the first lens group G1 and the second lens group G2. The back insertion glass BG is arranged at the back of the second lens group G2.

In focusing, the first lens group G1 including the first to third lenses L1-L3 and the second lens group G2 including the fourth to eighth lenses L4-L8 are moved to extend on the object side in the extending amount different from one another. The first lens group G1 and the second lens group G2 are supported by a support frame which is common to each group, and integrally move on a group-to-group basis in focusing. In this case, the optical aperture stop AP moves together with the first lens group G1.

In this Embodiment 2, the focal length F of the entire system, the opening F-number Fno and the half-field angle ω are F=14.6 mm, Fno=2.56 and ω=38.1°. The optical features such as the curvature radius (paraxial curvature radius for aspheric surface) R, the surface interval D between adjacent optical surfaces, the refractive index Nd, and the Abbe's number vd of the optical surface in each optical element in Embodiment 2 are as shown in the following table.

TABLE 3

| | Optical Feature | | | | | |
|---|---|---|---|---|---|---|
| SURFACE NUMBER | R | D | Nd | vd | REMARK | |
| 1 | 56.778 | 0.8 | 1.55332 | 71.7 | L1 | G1 |
| 2* | 9.524 | 5.5 | | | | |
| 3 | 18.291 | 2.09 | 1.68893 | 31.1 | L2 | |
| 4* | 18.067 | 3.5 | | | | |
| 5 | 19.487 | 1.92 | 1.67790 | 54.9 | L3 | |
| 6 | INF | 2.15 | | | | |
| 7 | INF | D1 | | | AP | |
| 8 | 19.446 | 3.17 | 1.88300 | 40.8 | L4 | G2 |
| 9 | −11.985 | 0.8 | 1.60342 | 38.0 | L5 | |
| 10 | 22.112 | 2.16 | | | | |
| 11 | −14.814 | 0.8 | 1.84666 | 23.8 | L6 | |
| 12 | 22.382 | 2.96 | 1.88300 | 40.8 | L7 | |
| 13 | −20.466 | 0.1 | | | | |
| 14 | −73.268 | 2.1 | 1.86400 | 40.6 | L8 | |
| 15* | −27.677 | D2 | | | | |
| 16 | INF | 3.2 | 1.51680 | 64.2 | BG | |
| 17 | INF | — | | | | |

In Table 3, the second, fourth and fifteenth surfaces with "*" are aspheric surfaces, and the parameters of aspheric surfaces in the equation (13) are as follows.

Aspheric Surface Parameter

Aspheric surface coefficients of the image side surface (second surface) of the first lens L1 are as follows.

$K=-0.73656$ $C4=3.07763\times10^{-5}$ $C6=3.01463\times10^{-7}$ $C8=-3.08586\times10^{-9}$ $C10=3.77407\times10^{-13}$ Aspheric surface coefficients of the image side surface (fourth surface) of the second lens are as follows.

$K = 1.47861$ $C4 = 1.40155 \times 10^{-5}$ $C6 = 3.50798 \times 10^{-7}$ $C8 = -8.23838 \times 10^{-9}$ $C10 = 1.57634 \times 10^{-10}$ Aspheric surface coefficients of the image side surface (fifteenth surface) of the eighth lens are as follows.

$K = 0.00000$ $C4 = 1.37175 \times 10^{-4}$ $C6 = -1.03097 \times 10^{-6}$ $C8 = 9.84520 \times 10^{-8}$ $C10 = -2.53855 \times 10^{-9}$ $C12 = 3.52653 \times 10^{-11}$ $C14 = -3.52185 \times 10^{-13}$ $C16 = 5.60864 \times 10^{-15}$ $C18 = -5.11979 \times 10^{-17}$ The variable interval D1 between the optical aperture stop AP and the fourth lens L4 and the variable interval D2 between the eighth lens L8 and the back insertion glass BG in Table 3 change as shown in the following table if the object distance changes to infinity and 250 mm.

TABLE 4

| | Variable Interval | |
|---|---|---|
| OBJECT DISTANCE | INFINITY | 250 mm |
| D1 | 2.65 | 2.37 |
| D2 | 13.77 | 14.61 |

The values corresponding to the above-described conditional expressions (1)-(12) in this Embodiment 2 are as follows.

$|f2/F1| = 52.5$ [1]

$L/Y' = 4.23$ [2]

$d1_{2-3}/d1_{1-2} = 0.64$ [3]

$f5/f6 = -2.64$ [4]

$F2/F = 1.44$ [5]

$L2/F = 0.83$ [6]

$\text{Log}|(D1_\infty - D1_t)/(D2_\infty - D2_t) \cdot t| = -2.87$ [7]

$f4_1/f4_2 = -0.69$ [8]

$|(R5+R2)/(R5-R2)| = 2.91$ [9]

$|(R8+R9)/(R8-R9)| = 0.20$ [10]

$f1/f3 = -0.72$ [11]

$|(R6+R7)/(R6-R7)| = 1.00$ [12]

Accordingly, the values according to the above-described conditional expressions (1)-(12) in this Embodiment 2 are within the ranges of the respective conditional expressions, and satisfy the conditional expressions (1)-(12), respectively.

Figure 4:
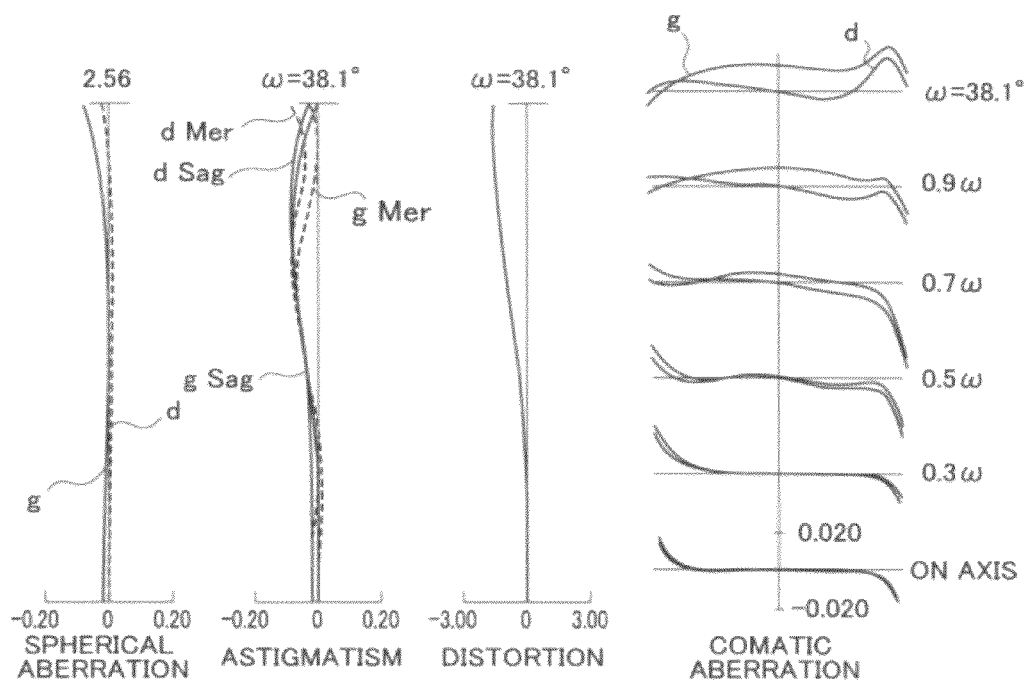
FIG. 4 provides aberration curves illustrating a spherical aberration, astigmatism, distortion and a comatic aberration in a state in which the imaging lens according to Embodiment 2 in FIG. 3 is focused on an infinity object.

FIG. 4 provides aberration curves of a spherical aberration, astigmatism, distortion and a comatic aberration in which the imaging lens according to Embodiment 2 is focused on an infinite object.

[Embodiment 3]

Figure 5:
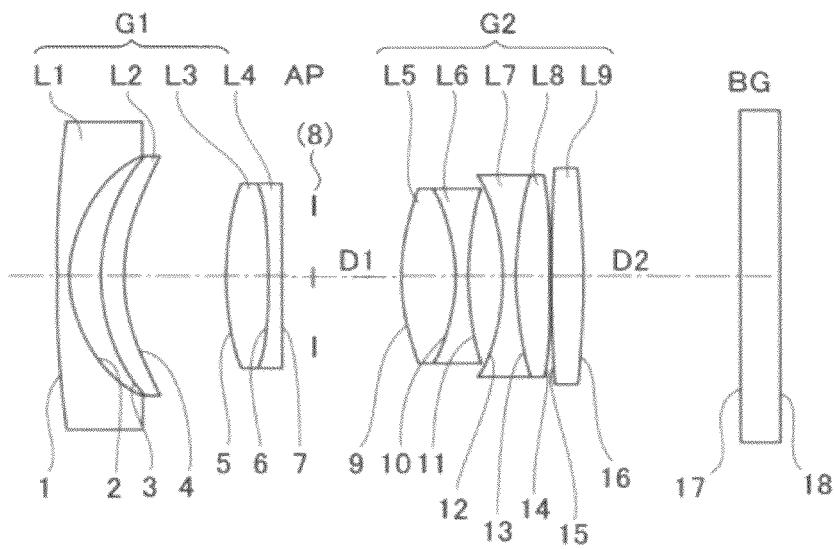
FIG. 5 provides a schematic sectional view illustrating a configuration of an optical system of an imaging lens in the optical axis according to Embodiment 3 of the present invention.

FIG. 5 provides a longitudinal sectional lens configuration in infinity focusing of an optical system of an imaging lens according to Embodiment 3 of the present invention.

The optical system of the imaging lens according to Embodiment 3 of the present invention includes in order from the object side to the image side a first lens L1, a second lens L2, a third lens L3, a fourth lens L4, an aperture stop AP, a fifth lens L5, a sixth lens L6, a seventh lens L7, an eighth lens L8, a ninth lens L9 and a back insertion glass BG as illustrated in FIG. 5. This optical system includes six groups having nine lenses in which the third and fourth lenses L3, L4 constitute a cemented lens, the fifth and sixth lenses L5, L6 constitute a cemented lens and the seventh and eighth lenses L7, L8 constitute a cemented lens. The surface numbers of the respective optical surfaces are illustrated in FIG. 5. As described above, the reference numbers in FIG. 5 are independently used with respect to each example; thus, even if the common reference numbers are used in FIGS. 1, 3, 7, 9, 11, and 13, Embodiments corresponding to these figures are not always the common configurations.

The first lens L1 has a negative refractive power, for example, a negative meniscus lens having a concave surface on the image side. The second lens L2 is a lens having a weak refractive power, for example, a positive meniscus lens having a convex surface on the object side and an aspheric surface on both surfaces. The third lens L3 is a lens having a positive refractive power, for example, a biconvex lens. The fourth lens L4 is a lens having a negative refractive power, for example, a biconcave lens. The third and fourth lenses L3, L4 are cemented to form a cemented lens having two lenses. The first, second, third and fourth lenses L1, L2, L3, L4 constitute the first lens group G1.

The fifth lens L5 is a lens having a positive refractive power, for example, a biconvex lens. The sixth lens is a lens having a negative refractive power, for example, a biconcave lens. The fifth and sixth lenses L5, L6 are cemented to form a cemented lens having two lenses. The seventh lens L7 is a lens having a negative refractive power, for example, a biconcave lens. The eighth lens L8 is a lens having a positive refractive power, for example, a biconvex lens. The seventh and eighth lenses L7, L8 are cemented to form a cemented lens having two lenses. The ninth lens L9 is a biconvex lens having a strong convex surface and an aspheric surface on the image side. The fifth and sixth lenses L5, L6 (L5-L6 cemented lens), the seventh and eighth lenses L7, L8 (L7-L8 cemented lens) and the ninth lens L9 constitute the second lens group G2.

The optical aperture stop AP is arranged between the first lens group G1 and the second lens group G2. The back insertion glass BG is disposed at the back of the second lens group G2.

In focusing, the first lens group G1 including the first to fourth lenses L1-L4 and the second lens group G2 including the fifth to ninth lenses L5-L9 are moved to extend on the object side in the extending amount different from one another. The first lens group G1 and the second lens group G2 are supported by a support frame which is common to each group, and integrally move on a group to group basis in focusing. In this case, the optical aperture stop AP moves together with the first lens group G1.

In this Embodiment 3, the focal length F of the entire system, the opening F-number Fno and the half-field angle ω are F=14.6 mm, Fno=2.56 and ω=38.1°. The optical features such as the curvature radius (paraxial curvature radius for aspheric surface) R, the surface interval D between adjacent optical surfaces, the refractive index Nd, and the Abbe's number νd of the optical surface in each optical element in Embodiment 3 are as shown in the following table.

TABLE 5

Optical Feature

| SURFACE NUMBER | R | D | Nd | νd | REMARK | |
|---|---|---|---|---|---|---|
| 1 | 99.160 | 0.8 | 1.49700 | 81.5 | L1 | G1 |
| 2 | 9.524 | 2.03 | | | | |
| 3* | 14.347 | 1.4 | 1.58313 | 59.4 | L2 | |
| 4* | 14.684 | 6.58 | | | | |
| 5 | 20.917 | 2.67 | 1.88300 | 40.8 | L3 | |
| 6 | −27.218 | 0.8 | 1.84666 | 23.8 | L4 | |
| 7 | 261.592 | 2.15 | | | | |
| 8 | INF | D1 | | | AP | |
| 9 | 16.680 | 3.45 | 1.88300 | 40.8 | L5 | G2 |
| 10 | −12.802 | 0.8 | 1.61293 | 37.0 | L6 | |
| 11 | 22.956 | 2.22 | | | | |
| 12 | −15.212 | 0.8 | 1.84666 | 23.8 | L7 | |
| 13 | 25.611 | 2.15 | 1.88300 | 40.8 | L8 | |
| 14 | −72.133 | 0.1 | | | | |
| 15 | 128.479 | 2.1 | 1.86400 | 40.6 | L9 | |
| 16* | −25.762 | D2 | | | | |
| 17 | INF | 3.2 | 1.51680 | 64.2 | BG | |
| 18 | INF | — | | | | |

The third, fourth and sixteenth surfaces with "*" in Table 5 are aspheric surfaces, respectively. The parameters of aspheric surfaces in the equation (13) are as follows.

Aspheric Surface Parameter

Aspheric surface coefficients of the object side surface (third surface) of the second lens L2 are as follows.

$K=0.00000$ $C4=1.23471\times10^{-4}$ $C6=-1.23738\times10^{-8}$ $C8=-5.46187\times10^{-9}$ $C10=-1.61521\times10^{-10}$ Aspheric surface coefficients of the image side surface (fourth lens) of the second lens L2 are as follows.

$K=0.00000$ $C4=1.04265\times10^{-4}$ $C6=2.22995\times10^{-7}$ $C8=-3.67765\times10^{-8}$ $C10=1.42375\times10^{-11}$ Aspheric surface coefficients of the image side surface (sixteenth lens) of the ninth lens L9 are as follows.

$K=0.00000$ $C4=1.77405\times10^{-4}$ $C6=-7.11015\times10^{-7}$ $C8=6.38540\times10^{-8}$ $C10=-1.14031\times10^{-9}$ $C12=2.90943\times10^{-12}$ $C14=2.27376\times10^{-13}$ $C16=-3.56918\times10^{-15}$ $C18=1.86174\times10^{-17}$ The variable interval D1 between the optical aperture stop AP and the fifth lens L5 and the variable interval D2 between the ninth lens L9 and the back insertion glass BG in Table 5 change as shown in the following table if the object distance changes to infinity and 250 mm.

TABLE 6

Variable Interval

| OBJECT DISTANCE | INFINITY | 250 mm |
|---|---|---|
| D1 | 5.37 | 5.08 |
| D2 | 10.29 | 11.14 |

The values corresponding to the conditional expressions [1]-(12) in Embodiment 3 are as follows.

$|f2/F1|=29.1$ [1]

$L/Y'=4.17$ [2]

$d1_{2-3}/d1_{1-2}=3.25$ [3]

$f5/f6=-0.98$ [4]

$F2/F=1.49$ [5]

$L2/F=0.80$ [6]

$\text{Log}|(D1_\infty-D1_t)/(D2_\infty-D2_t)\cdot t|=-2.85$ [7]

$f4_1/f4_2=-0.65$ [8]

$|(R5+R2)/(R5-R2)|=2.67$ [9]

$|(R8+R9)/(R8-R9)|=0.20$ [10]

$f1/f3=-0.86$ [11]

$|(R6+R7)/(R6-R7)|=1.14$ [12]

Accordingly, the values according to the conditions 91)-(12) in this Embodiment 3 are within the ranges of the respective conditions, and satisfy the conditional expressions (1)-(12), respectively.

Figure 6:
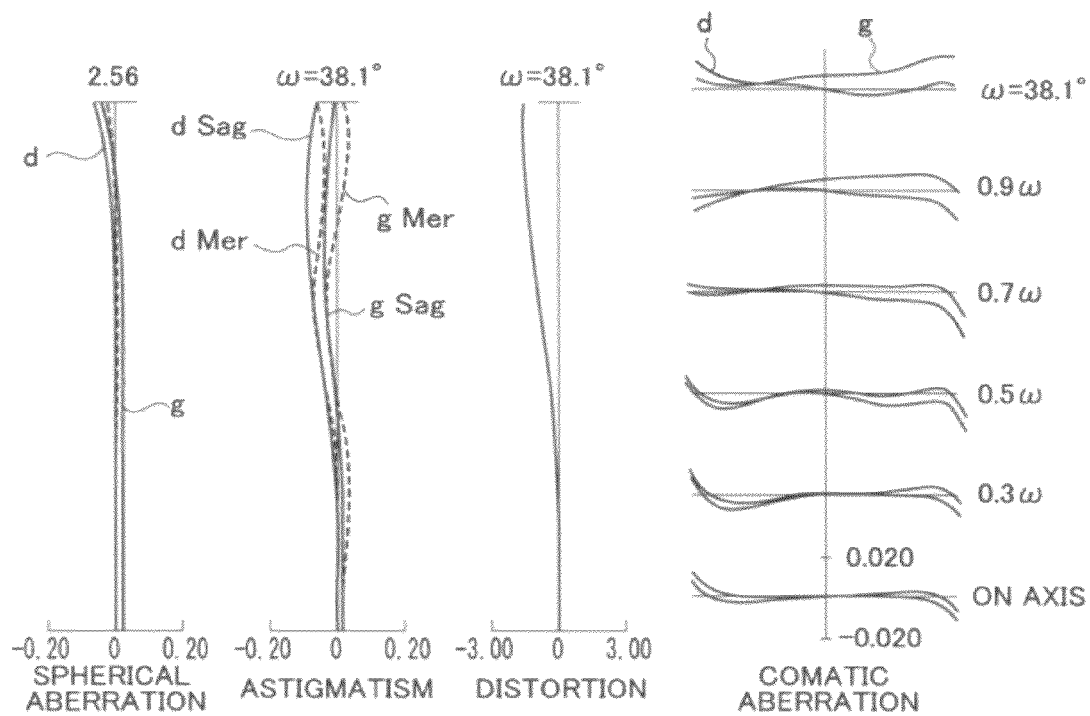
FIG. 6 provides aberration curves illustrating a spherical aberration, astigmatism, distortion and a comatic aberration in a state in which the imaging lens according to Embodiment 3 in FIG. 5 is focused on an infinity object.

FIG. 6 provides aberration curves of a spherical aberration, astigmatism, distortion and a comatic aberration in a state in which the imaging lens according to Embodiment 3 is focused on an infinite object.

[Embodiment 4]

Figure 7:
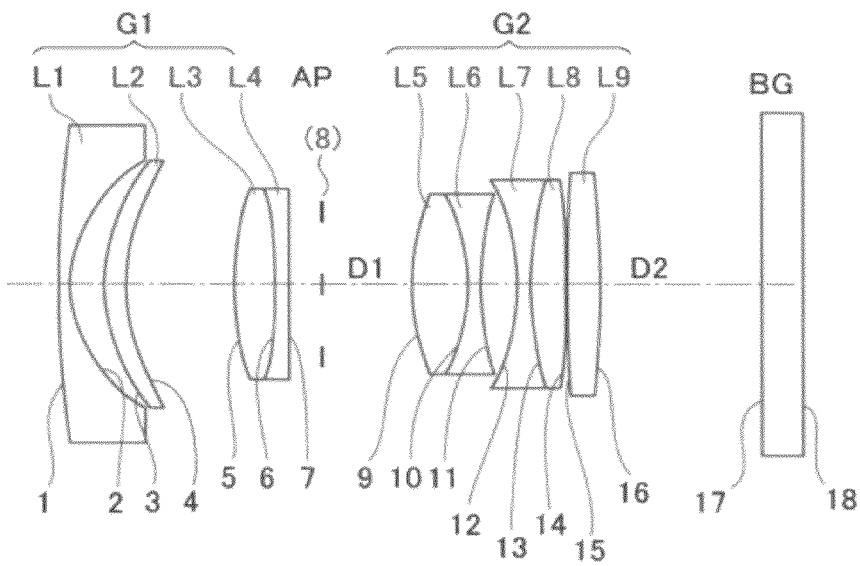
FIG. 7 provides a schematic sectional view illustrating a configuration of an optical system of an imaging lens in the optical axis according to Embodiment 4 of the present invention.

FIG. 7 provides a longitudinal sectional lens configuration in infinity focusing of an optical system of an imaging lens according to Embodiment 4 of the present invention.

The optical system of the imaging lens according to Embodiment 4 of the present invention includes in order from the object side to the image side a first lens L1, a second lens L2, a third lens L3, a fourth lens L4, an aperture stop AP, a fifth lens L5, a sixth lens L6, a seventh lens L7, an eighth lens L8, a ninth lens L9, and an insertion glass BG. This optical system includes six groups having nine lenses in which the third and fourth lenses L3, L4 constitute a cemented lens, the fifth and sixth lenses L5, L6 constitute a cemented lens and the seventh and eighth lenses L7, L8 constitute a cemented lens. The surface numbers of the respective optical surfaces are illustrated in FIG. 7. As described above, the reference numbers in FIG. 7 are independently used with respect to each example; thus, even if the common reference numbers are used in FIGS. 1, 3, 5, 9, 11 and 13, Embodiments corresponding to these figures are not always the common configurations.

The first lens L1 includes a negative refractive power, for example, a negative meniscus lens having a concave surface on the image side. The second lens L2 is a lens having a weak refractive power, for example, a positive meniscus lens having a convex surface on the object side and an aspheric surface on both surfaces. The third lens L3 is a lens having a positive refractive power, for example, a biconvex lens. The fourth lens L4 is a lens having a negative refractive power, for example, a biconcave lens. The third and fourth lenses L3, L4 are cemented to form a cemented lens having two lenses. The first, second, third, fourth lenses L1, L2, L3, L4 constitute the first lens group G1.

The fifth lens L5 is a lens having a positive refractive power, for example, a biconvex lens. The sixth lens L6 is a lens having a negative refractive power, for example, a biconcave lens. The fifth and sixth lenses L5, L6 are cemented to form a cemented lens having two lenses.

The seventh lens L7 is a lens having a negative refractive power, for example, a biconcave lens. The eighth lens L8 is a lens having a positive refractive power, for example, a biconvex lens. The seventh and eighth lenses are cemented to form a cemented lens having two lenses. The ninth lens L9 is a biconvex lens having a strong convex surface on the image side and an aspheric surface on the image side. The fifth and sixth lenses (L5-L6 cemented lens), the seventh and eighth lenses (L7-L8 cemented lens) and the ninth lens L9 constitute the second lens group G2.

The optical aperture stop AP is arranged between the first and second lens groups G1, G2. The back insertion glass BG is arranged at the back of the second lens group G2.

In focusing, the first lens group G1 including the first to fourth lenses L1-L4 and the second lens group G2 including the fifth to ninth lenses L5-L9 are moved to extend on the object side in the extending amount different from one another. The first lens group G1 and the second lens group G2 are supported by a support frame which is common to each group, and integrally move on a group to group basis in focusing. In this case, the optical aperture stop AP moves together with the first lens group G1.

In this Embodiment 4, the focal length F of the entire system, the opening F-number Fno and the half-field angle ω are F=14.6 mm, Fno=2.56 and ω=38.1°. The optical features such as the curvature radius R (paraxial curvature radius for aspheric surface), the surface interval D between adjacent optical surfaces, the refractive index Nd and the Abbe's number vd of the optical surface in each optical element in Embodiment 4 are as follows.

TABLE 7

Optical Feature

| SURFACE NUMBER | R | D | Nd | vd | REMARK | |
|---|---|---|---|---|---|---|
| 1 | 80.853 | 0.8 | 1.49700 | 81.5 | L1 | G1 |
| 2 | 9.524 | 2.04 | | | | |
| 3* | 14.015 | 1.2 | 1.58313 | 59.4 | L2 | |
| 4* | 14.137 | 6.82 | | | | |
| 5 | 20.906 | 2.66 | 1.88300 | 40.8 | L3 | |
| 6 | −27.550 | 0.8 | 1.84666 | 23.8 | L4 | |
| 7 | 260.415 | 2.15 | | | | |
| 8 | INF | D1 | | | AP | |
| 9 | 16.933 | 3.41 | 1.88300 | 40.8 | L5 | G2 |
| 10 | −12.670 | 0.8 | 1.61293 | 37.0 | L6 | |
| 11 | 23.060 | 2.22 | | | | |
| 12 | −14.899 | 0.8 | 1.84666 | 23.8 | L7 | |
| 13 | 26.852 | 2.14 | 1.88300 | 40.8 | L8 | |
| 14 | −64.389 | 0.1 | | | | |
| 15 | 142.383 | 2.1 | 1.86400 | 40.6 | L9 | |
| 16* | −25.602 | D2 | | | | |
| 17 | INF | 3.2 | 1.51680 | 64.2 | BG | |
| 18 | INF | — | | | | |

In Table 7, the third, fourth, and sixteenth surfaces with "*" are aspheric surfaces, respectively, and the parameters of aspheric surfaces in the equation (13) are as follows.

Aspheric Surface Parameter

Aspheric surface coefficients of the object side surface (third surface) of the second lens L2 are as follows.

$K=0.00000$ $C4=1.26244 \times 10^{-4}$ $C6=1.08760 \times 10^{-7}$ $C8=-1.45512 \times 10^{-8}$ $C10=-1.68437 \times 10^{-10}$ Aspheric surface coefficients of the image side surface (fourth surface) of the second lens L2 are as follows.

$K=0.00000$ $C4=1.01972 \times 10^{-4}$ $C6=4.98838 \times 10^{-7}$ $C8=-5.40479 \times 10^{-8}$ $C10=9.90734 \times 10^{-11}$ Aspheric surface coefficients of the image side surface (sixteenth surface) of the ninth lens L9 are as follows.

$K=0.00000$ $C4=1.74039 \times 10^{-4}$ $C6=-6.67592 \times 10^{-7}$ $C8=5.76349 \times 10^{-8}$ $C10=-9.37829 \times 10^{-10}$ $C12=1.27831 \times 10^{-12}$ $C14=1.60060 \times 10^{-13}$ $C16=-1.84285 \times 10^{-15}$ $C18=6.58763 \times 10^{-18}$ The variable interval D1 between the optical aperture stop AP and the fifth lens L5, the variable interval D2 between the ninth lens L9 and the back insertion glass BG in Table 7 change as shown in the following table if the object distance changes to infinity and 250 mm.

TABLE 8

Variable Interval

| OBJECT DISTANCE | INFINITY | 250 mm |
|---|---|---|
| D1 | 5.37 | 5.00 |
| D2 | 10.36 | 11.40 |

The values corresponding to the conditional expressions (1)-(12) in this Embodiment 4 are as follows.

$|f2/F|=48.4$ [1]

$L/Y'=4.17$ [2]

$d1_{2-3}/d1_{1-2}=3.34$ [3]

$f5/f6=-0.98$ [4]

$F2/F=1.51$ [5]

$L2/F=0.79$ [6]

$\text{Log}|(D1_\infty-D1_t)/(D2_\infty-D2_t)\cdot t|=-2.85$ [7]

$f4_1/f4_2=-0.66$ [8]

$|(R5+R2)/(R5-R2)|=2.67$ [9]

$|(R8+R9)/(R8-R9)|=0.21$ [10]

$f1/f3=-0.88$ [11]

$|(R6+R7)/(R6-R7)|=1.14$ [12]

Accordingly, the values according to the conditional expressions (1)-(12) in Embodiment 4 are within the ranges of the respective conditional expressions and satisfy the conditional expressions (1)-(12), respectively.

Figure 8:
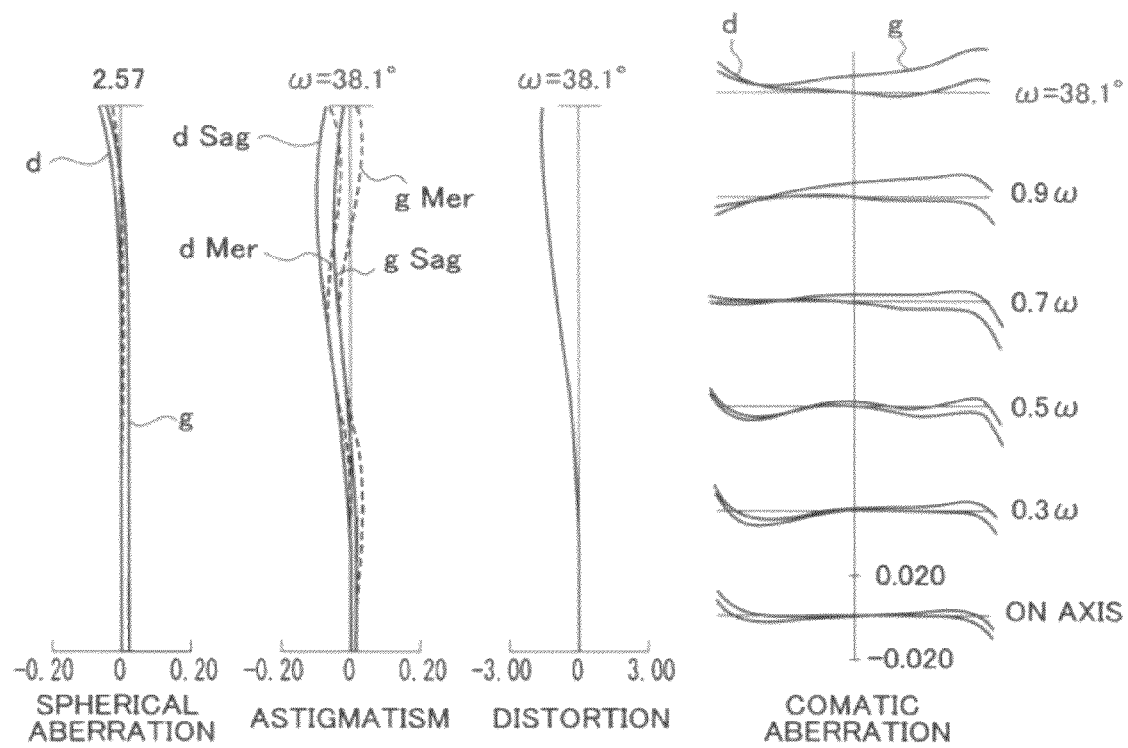
FIG. 8 provides aberration curves illustrating a spherical aberration, astigmatism, distortion and a comatic aberration in a state in which the imaging lens according to Embodiment 4 in FIG. 7 is focused on an infinity object.

FIG. 8 provides aberration curves of a spherical aberration, astigmatism, distortion and a comatic aberration in a state in which the imaging lens according to Embodiment 4 is focused on an infinite object.

[Embodiment 5]

Figure 9:
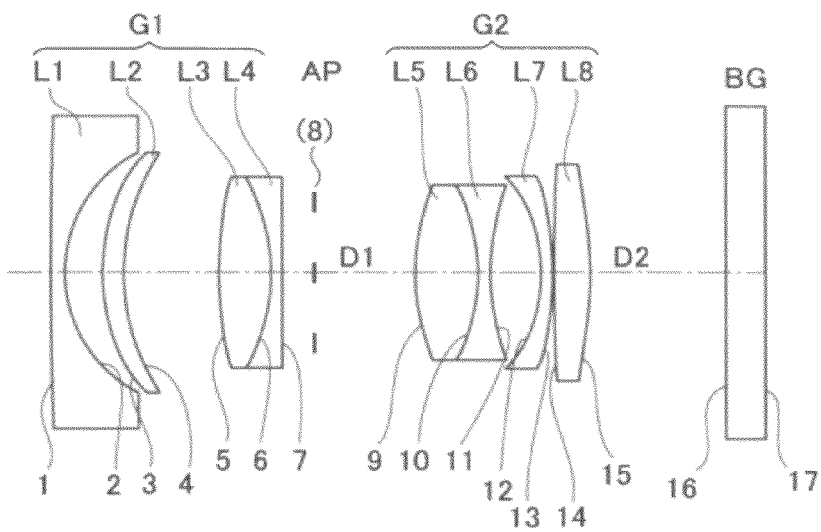
FIG. 9 provides a schematic sectional view illustrating a configuration of an optical system of an imaging lens in the optical axis according to Embodiment 5 of the present invention.

FIG. 9 provides a longitudinal sectional lens configuration in infinity focusing of an optical system of an imaging lens according to Embodiment 5 of the present invention.

The optical system of the imaging lens according to Embodiment 5 includes in order from the object side to the image side a first lens L1, a second lens L2, a third lens L3, a fourth lens L4, an optical aperture stop AP, a fifth lens L5, a sixth lens L6, a seventh lens L7, an eighth lens L8, and a back insertion glass BG. This optical system includes six groups having eight lenses in which the third and fourth lenses L3, L4 constitute a cemented lens and the fifth and sixth lenses L5, L6 constitute a cemented lens. The surface numbers of the respective optical surfaces are illustrated in FIG. 9. As described above, the reference numbers in FIG. 9 are independently used with respect to each example; thus, even if the common reference numbers are used in FIGS. 1, 3, 5, 7, 11 and 13, Examples corresponding to these figures are not always the common configurations.

The first lens L1 includes a negative refractive power, for example, a negative meniscus lens having a concave surface on the image side. The second lens L2 is a lens having a weak refractive power, for example, a positive meniscus lens having a convex surface on the object side and an aspheric surface on both surfaces. The third lens L3 is a lens having a positive refractive power, for example, a biconvex lens. The fourth lens L4 is a lens having a negative refractive power, for example, a negative meniscus lens having a concave surface on the object side. The third and fourth lenses L3, L4 are cemented to form a cemented lens having two lenses. The first, second, third and fourth lenses L1, L2, L3, L4 constitute the first lens group G1.

The fifth lens L5 is a lens having a positive refractive power, for example, a biconvex lens. The sixth lens L6 is a lens having a negative refractive power, for example, a biconcave lens. The fifth and sixth lenses are cemented to from a cemented lens having two lenses.

The seventh lens L7 is a negative meniscus lens having a concave surface on the object side. The eighth lens L8 is a biconvex lens having a strong convex surface on the image side and an aspheric surface on the image side. The fifth and sixth lenses (L5-L6 cemented lens), the seventh lens L7 and the eighth lens L8 constitute the second lens group G2.

The optical aperture stop AP is arranged between the first lens group G1 and the second lens group G2. The back insertion glass BG is disposed at the back of the second lens group G2.

In focusing, the first lens group G1 including the first to fourth lenses L1-L4 and the second lens group G2 including the fifth to eighth lenses L5-L8 are moved to extend on the object side in the extending amount different from one another. The first lens group G1 and the second lens group G2 are supported by a support frame which is common to each group, and integrally move on a group to group basis in focusing. In this case, the optical aperture stop AP moves together with the first lens group G1.

In Embodiment 5, the focal length F of the entire system, the opening F-number Fno, and the half-field angle ω are F=14.6 mm, Fno=2.56 and ω=38.1°. The optical features such as the curvature radius (paraxial curvature radius for aspheric surface) R, the surface interval D between adjacent optical surfaces, the refractive index Nd, and the Abbe's number vd of the optical surface in each optical element in Embodiment 5 are as follows.

TABLE 9

Optical Feature

| SURFACE NUMBER | R | D | Nd | vd | REMARK | |
|---|---|---|---|---|---|---|
| 1 | 576.927 | 0.8 | 1.49700 | 81.5 | L1 | G1 |
| 2 | 9.524 | 2.5 | | | | |
| 3* | 19.062 | 1.4 | 2.00170 | 20.6 | L2 | |
| 4* | 22.678 | 5.99 | | | | |
| 5 | 25.188 | 3.29 | 1.88300 | 40.8 | L3 | |
| 6 | -13.778 | 0.8 | 1.84666 | 23.8 | L4 | |
| 7 | -550.642 | 2.15 | | | | |
| 8 | INF | D1 | | | AP | |
| 9 | 16.884 | 4.03 | 1.88300 | 40.8 | L5 | G2 |
| 10 | -11.807 | 0.8 | 1.61293 | 37.0 | L6 | |
| 11 | 18.788 | 3.20 | | | | |
| 12 | -10.792 | 0.8 | 1.92286 | 18.9 | L7 | |
| 13 | -20.594 | 0.06 | | | | |
| 14 | 371.853 | 2.22 | 1.86400 | 40.6 | L8 | |
| 15* | -21.330 | D2 | | | | |
| 16 | INF | 3.2 | 1.51680 | 64.2 | BG | |
| 17 | INF | — | | | | |

In Table 9, the third, fourth, and fifteenth surfaces with "*" are aspheric surfaces, respectively, and the parameters of aspheric surfaces in the equation (13) are as follows.

Aspheric Surface Parameter

Aspheric surface coefficients of the object side surface (third surface) of the second lens L2 are as follows.

$K=0.00000$ $C4=1.79602\times 10^{-4}$ $C6=-4.51925\times 10^{-10}$ $C8=9.92095\times 10^{-9}$ $C10=-1.26488\times 10^{10}$ Aspheric surface coefficients of the image side surface (fourth surface) of the second lens L2 are as follows.

$K=0.00000$ $C4=1.81770\times 10^{-4}$ $C6=4.32961\times 10^{-8}$ $C8=2.42569\times 10^{-9}$ $C10=-1.76043\times 10^{-10}$ Aspheric surface coefficients of the image side surface (fifteenth surface) of the eighth lens L8 are as follows.

$K=0.00000$ $C4=1.83412\times 10^{-4}$ $C6=-2.11920\times 10^{-6}$ $C8=1.50832\times 10^{-7}$ $C10=-3.99137\times 10^{-9}$ $C12=4.13393\times 10^{-11}$ $C14=4.43141\times 10^{-13}$ $C16=-1.47302\times 10^{-14}$ $C18=1.01013\times 10^{-16}$ The variable interval D1 between the optical aperture stop AP and the fifth lens L5, and the variable interval D2 between the eighth lens L8 and the back insertion glass BG in Table 9 change as shown in the following table if the object distance changes to infinity and 250 mm.

TABLE 10

| | Variable Interval | |
|---|---|---|
| OBJECT DISTANCE | INFINITY | 250 mm |
| D1 | 6.20 | 5.89 |
| D2 | 9.11 | 9.95 |

The values corresponding to the conditional expressions (1)-(12) in Embodiment 5 are as follows.

$|f2/F|=6.9$      [1]

$L/Y'=4.14$      [2]

$d1_{2\text{-}3}/d1_{1\text{-}2}=2.40$      [3]

$f5/f6=-1.09$      [4]

$F2/F=1.49$      [5]

$L2/F=0.76$      [6]

$\text{Log}|(D1_\infty-D1_t)/(D2_\infty-D2_t)\cdot t|=-2.83$      [7]

$f4_1/f4_2=-0.72$      [8]

$|(R5+R2)/(R5-R2)|=2.22$      [9]

$|(R8+R9)/(R8-R9)|=0.27$      [10]

$f1/f3=-0.76$      [11]

$|(R6+R7)/(R6-R7)|=0.94$      [12]

Accordingly, the values according to the conditional expressions (1)-(12) in Embodiment 5 are within the range of the respective conditional expressions and satisfy the conditional expressions (1)-(12), respectively.

Figure 10:
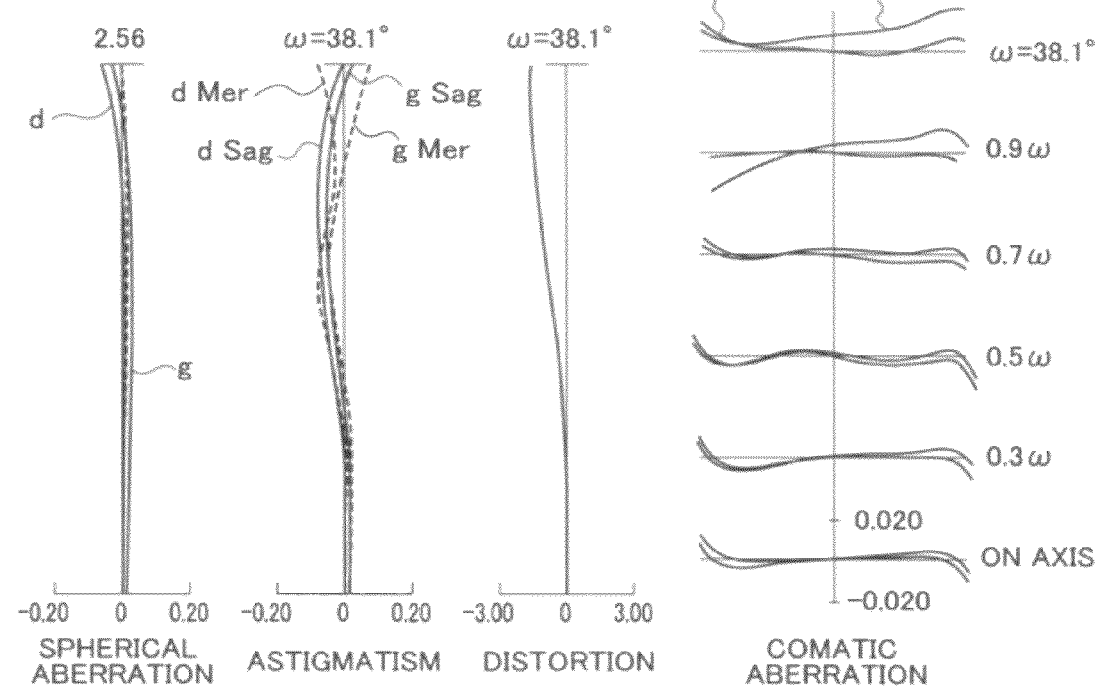
FIG. 10 provides aberration curves illustrating a spherical aberration, astigmatism, distortion and a comatic aberration in a state in which the imaging lens according to Embodiment 5 in FIG. 9 is focused on an infinity object.

FIG. 10 provides aberration curves of a spherical aberration, astigmatism, distortion and a comatic aberration in a state in which the imaging lens according to Embodiment 5 is focused on an infinite object.

[Embodiment 6]

Figure 11:
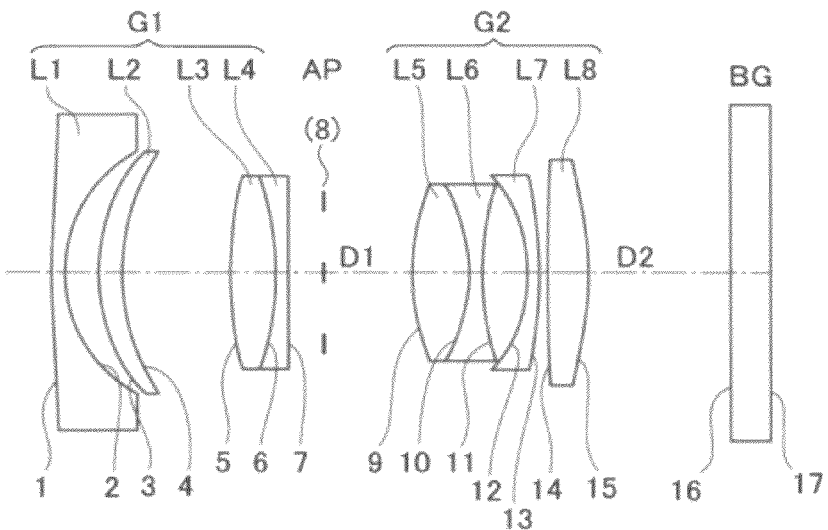
FIG. 11 provides a schematic sectional view illustrating the configuration of an optical system of an imaging lens in the optical axis according to Embodiment 6 of the present invention.

FIG. 11 provides a longitudinal sectional lens configuration in infinity focusing of an optical system of an imaging lens according to Embodiment 6 of the present invention.

The optical system of the imaging lens according to Embodiment 6 of the present invention includes in order from the object side to the image side a first lens L1, a second lens L2, a third lens L3, a fourth lens L4, an aperture stop AP, a fifth lens L5, a sixth lens L6, a seventh lens L7, an eighth lens L8 and a back insertion glass BG as illustrated in FIG. 11. The optical system includes six groups having eight lenses in which the third and fourth lenses L3, L4 constitute a cemented lens and the fifth and sixth lenses L5, L6 constitute a cemented lens. The surface numbers of the respective optical surfaces are illustrated in FIG. 11. As described above, the reference numbers in FIG. 11 are independently used with respect to each example; thus, even if the common reference numbers are used in FIGS. 1, 3, 5, 7, 9, and 13, Embodiments corresponding to these figures are not always the common configurations.

The first lens L1 has a negative refractive power, for example, a negative meniscus lens having a concave surface on the image side. The second lens L2 is a lens having a weak refractive power, for example, a positive meniscus lens having a convex surface on the object side and having an aspheric surface on both surfaces. The third lens L3 is a lens having a positive refractive power, for example, a biconvex lens. The fourth lens L4 is a lens having a negative refractive power, for example, a negative meniscus lens having a concave surface on the object side. The third and fourth lenses L3, L4 are cemented to form a cemented lens having two lenses. The first, second, third and fourth lenses constitute the first lens group G1.

The fifth lens L5 is a lens having a positive refractive power, for example, a biconvex lens. The sixth lens L6 is a lens having a negative refractive power, for example, a biconcave lens. The fifth and sixth lenses are cemented to form a cemented lens having two lenses.

The seventh lens L7 is a negative meniscus lens having a concave surface on the object side. The eighth lens L8 is a biconvex lens having a strong convex surface on the image side and an aspheric surface on the image side. The fifth, and sixth lenses (L5-L6 cemented lens), the seventh lens and the eighth lens L7, L7, L8 constitute the second lens group G2.

The optical aperture stop AP is arranged between the first lens group G1 and the second lens group G2. The back insertion glass BG is arranged at the back of the second lens group G2.

In focusing, the first lens group G1 including the first to fourth lenses L1-L4 and the second lens group G2 including the fifth to eighth lenses L5-L8 are moved to extend in the extending amount different from one another. The first lens group G1 and the second lens group G2 are supported by a support frame which is common to each group, and integrally move on a group to group basis in focusing. In this case, the optical aperture stop AP moves together with the first lens group G1.

In Embodiment 6, the focal length F of the entire system, the opening F number Fno, and the half-field angle ω are F=14.6 mm, Fno=2.55 and ω=38.1°. The optical features such as the curvature radius (paraxial curvature radius for aspheric surface) R, the surface interval D between adjacent optical surfaces, the refractive index Nd, and the Abbe's number vd of the optical surface in each optical element in Embodiment 6 are as follows.

TABLE 11

Optical Feature

| SURFACE NUMBER | R | D | Nd | vd | REMARK | |
|---|---|---|---|---|---|---|
| 1 | 128.025 | 0.8 | 1.49700 | 81.5 | L1 | G1 |
| 2 | 9.524 | 2.2 | | | | |
| 3* | 17.663 | 1.4 | 1.52470 | 56.2 | L2 | |
| 4* | 19.302 | 6.82 | | | | |
| 5 | 21.553 | 2.89 | 1.88300 | 40.8 | L3 | |
| 6 | −21.179 | 0.8 | 1.84666 | 23.8 | L4 | |
| 7 | −467.768 | 2.15 | | | | |
| 8 | INF | D1 | | | AP | |
| 9 | 18.301 | 3.56 | 1.88300 | 40.8 | L5 | G2 |
| 10 | −11.222 | 0.8 | 1.61293 | 37.0 | L6 | |
| 11 | 20.668 | 2.80 | | | | |
| 12 | −10.740 | 0.8 | 1.92286 | 18.9 | L7 | |
| 13 | −30.970 | 0.48 | | | | |
| 14 | 123.859 | 2.54 | 1.86400 | 40.6 | L8 | |
| 15* | −18.791 | D2 | | | | |
| 16 | INF | 3.2 | 1.51680 | 64.2 | BG | |
| 17 | INF | — | | | | |

In Table 11, the third, fourth and fifteenth surfaces with "*" are aspheric surfaces, respectively, and the parameters of the respective aspheric surfaces in the equation (13) are as follows.

Aspheric Surface Parameter

Aspheric surface coefficients of the object side surface (third surface) of the second lens L2 are as follows.

$K=0.00000$ $C4=2.48561 \times 10^{-4}$ $C6=-4.73354 \times 10^{-7}$ $C8=9.07952 \times 10^{-9}$ $C10=-2.13708 \times 10^{-10}$ Aspheric surface coefficients of the image side surface (fourth surface) of the second lens L2 are as follows.

$K=0.00000$ $C4=2.38608 \times 10^{-4}$ $C6=-2.24056 \times 10^{-7}$ $C8=-1.69673 \times 10^{-8}$ $C10=-1.26562 \times 10^{-10}$ Aspheric surface coefficients of the image side surface (fifteenth surface) of the eighth lens L8 are as follows.

$K=0.00000$ $C4=1.85974 \times 10^{-4}$ $C6=-2.19348 \times 10^{-8}$ $C8=1.49064 \times 10^{-7}$ $C10=-4.03684 \times 10^{-9}$ $C12=4.31907 \times 10^{-11}$ $C14=3.96025 \times 10^{-13}$ $C16=-1.41447 \times 10^{-14}$ $C18=9.82718 \times 10^{-17}$ The variable interval D1 between the optical aperture stop AP and the fifth lens L5 and the variable interval D2 between the eighth lens L8 and the back insertion glass GB in Table 11 change as follows if the object distance changes to infinity and 250 mm.

TABLE 12

Variable Interval

| OBJECT DISTANCE | INFINITY | 250 mm |
|---|---|---|
| D1 | 5.75 | 5.48 |
| D2 | 9.52 | 10.37 |

The values corresponding to the conditions (1)-(12) in this Example 6 are as follows.

$|f2/F|=21.0$ [1]

$L/Y'=4.13$ [2]

$d1_{2-3}/d1_{1-2}=3.10$ [3]

$f5/f6=-0.95$ [4]

$F2/F=1.64$ [5]

$L2/F=0.75$ [6]

$\text{Log}|(D1_\infty-D1_t)/(D2_\infty-D2_t)\cdot t|=-2.90$ [7]

$f4_1/f4_2=0.71$ [8]

$|(R5+R2)/(R5-R2)|=2.58$ [9]

$|(R8+R9)/(R8-R9)|=0.32$ [10]

$f1/f3=-0.92$ [11]

$|(R6+R7)/(R6-R7)|=0.92$ [12]

Accordingly, the values according to the conditional expressions (1)-(12) in Embodiment 6 are within the ranges of the respective conditional expressions, and satisfy the conditional expressions (1)-(12), respectively.

Figure 12:
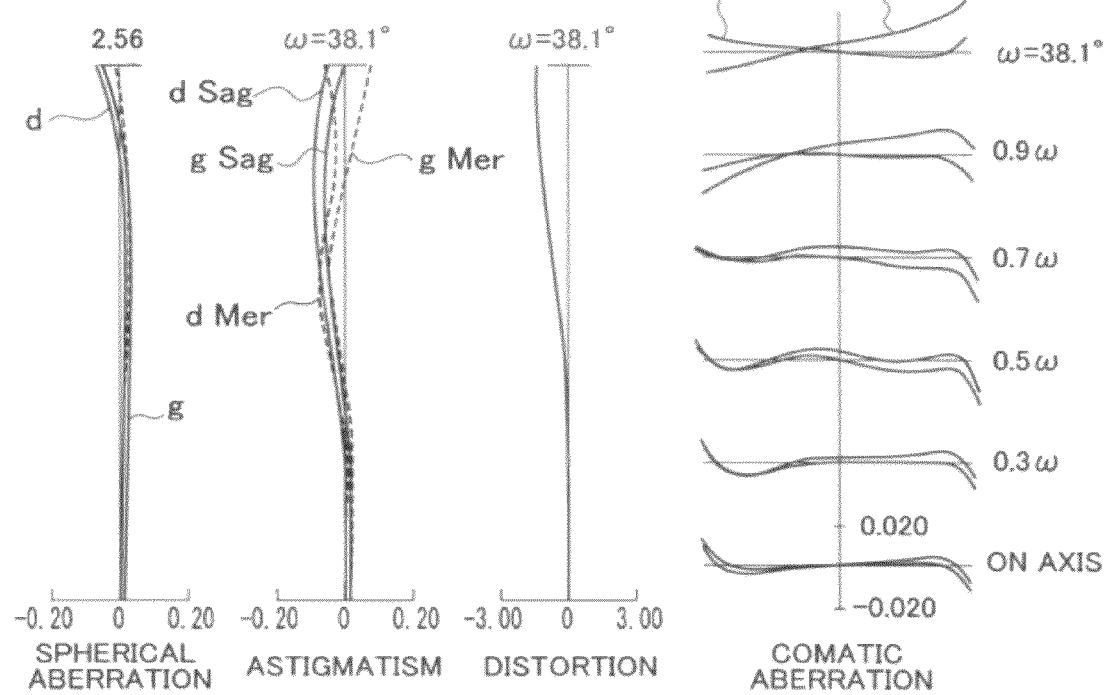
FIG. 12 provides aberration curves illustrating a spherical aberration, astigmatism, distortion and a comatic aberration in a state in which the imaging lens according to Embodiment 6 in FIG. 11 is focused on an infinity object.

FIG. 12 provides aberration curves of a spherical aberration, astigmatism, distortion and a comatic aberration in a state in which the imaging lens according to Embodiment 6 is focused on an infinite object.

[Embodiment 7]

Figure 13:
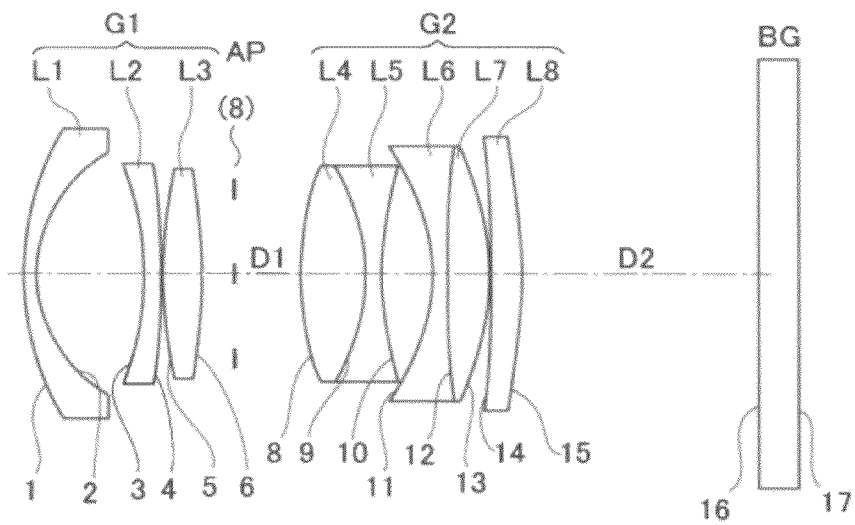
FIG. 13 provides a schematic sectional view illustrating a configuration of an optical system of an imaging lens in the optical axis according to Embodiment 7 of the present invention.

FIG. 13 provides a longitudinal sectional lens configuration in infinity focusing of an optical system of an imaging lens according to Embodiment 7 of the present invention.

The optical system of the imaging lens according to Embodiment 7 includes in order from the object side to the image side a first lens L1, a second lens L2, a third lens L3, an aperture stop AP, a fourth lens L4, a fifth lens L5, a sixth lens L6, a seventh lens L7, an eighth lens L8, and a back insertion glass BG. This optical system includes six groups having eight lenses in which the fourth and fifth lenses L4, L5 constitute a cemented lens and the sixth and seventh lenses L6, L7 constitute a cemented lens. The surface numbers of the respective optical surfaces are illustrated in FIG. 13. As described above, the reference numbers in FIG. 13 are independently used with respect to each example; thus, even if the common reference numbers are used in FIGS. 1, 3, 5, 7, 9, and 11, Embodiments corresponding to these figures are not always the common configurations.

The first lens L1 includes a negative refractive power, for example, a negative meniscus lens having a concave surface on the image side and an aspheric surface on the image side. The second lens L2 is a lens having a weak refractive power, for example, a negative meniscus lens having a convex surface on the image side. The third lens L3 is a lens having a positive refractive power, for example, a biconvex lens. The first, second and third lenses L1-L3 constitute the first lens group G1.

The fourth lens L4 is a lens having a positive refractive power, for example, a biconvex lens. The fifth lens L5 is a lens having a negative refractive power, for example, a biconcave lens. The fourth and fifth lenses L4, L5 are cemented to form a cemented lens having two lenses.

The sixth lens L6 is a lens having a negative refractive power, for example, a biconcave lens. The seventh lens L7 is a lens having a positive refractive power, for example, a biconvex lens. The sixth and seventh lenses L6, L7 are cemented to form a cemented lens having two lenses. The eighth lens L8 is a positive meniscus lens having a convex surface on the image side and an aspheric surface on the image side. The fourth and fifth lenses L4, L5, the sixth and seventh lenses L6, L7 and the eighth lens L8 constitute the second lens group G2.

The optical aperture stop AP is arranged between the first lens group G1 and the second lens group G2 and the back insertion glass BG is arranged at the back of the second lens group G2.

In focusing, the first lens group G1 including the first to third lenses L1-L3 and the second lens group G2 including the fourth to eighth lenses L4-L8 are moved to extend on the object side in the extending amount different from one another. The first and second lens groups G1, G2 are supported by a support frame which is common to each group, and integrally move on a group to group basis in focusing. In this case, the optical aperture stop AP moves together with the first lens group G1.

In Embodiment 7, the focal distance F, the opening F-number Fno, and the half-field angle ω are F=19.0 mm, Fno=2.53, and ω=37.4°. The optical features such as the curvature radius (paraxial curvature radius for aspheric surface) R, the surface interval D between the adjacent optical surfaces, the refractive index Nd, and the Abbe's number vd of the optical surface in each optical element in Embodiment 7 are as follows.

TABLE 13

| SURFACE NUMBER | R | D | Nd | vd | REMARK | |
|---|---|---|---|---|---|---|
| 1 | 20.04 | 0.8 | 1.6188 | 63.9 | L1 | G1 |
| 2* | 9.52 | 6.8 | | | | |
| 3 | −21.04 | 1.0 | 1.6727 | 32.1 | L2 | |
| 4 | −64.44 | 0.1 | | | | |
| 5 | 30.67 | 2.5 | 1.8160 | 46.6 | L3 | |
| 6 | −40.21 | 2.1 | | | | |
| 7 | INF | D1 | | | AP | |
| 8 | 22.42 | 4.1 | 1.8830 | 40.8 | L4 | G2 |
| 9 | −13.96 | 1.0 | 1.6259 | 35.7 | L5 | |
| 10 | 26.17 | 3.3 | | | | |
| 11 | −13.72 | 0.9 | 1.8081 | 22.8 | L6 | |
| 12 | 93.61 | 2.6 | 1.8348 | 42.7 | L7 | |
| 13 | −19.29 | 0.1 | | | | |
| 14 | −83.67 | 2.0 | 1.8061 | 40.9 | L8 | |
| 15* | −26.05 | D2 | | | | |
| 16 | INF | 2.5 | 1.5168 | 64.2 | BG | |
| 17 | INF | — | | | | |

In Table 13, the second and fifteenth surfaces with "*" are aspheric surfaces, respectively, and the parameters of respective aspheric surfaces in the equation (13) are as follows.

Aspheric Surface Parameter

Aspheric surface coefficients of the image side surface (second surface) of the first lens L1 are as follows.

$K=-0.586$ $C4=7.104 \times 10^{-5}$ $C6=8.861 \times 10^{-7}$ $C8=2.716 \times 10^{-9}$ $C10=-7.117 \times 10^{-11}$ $C12=2.029 \times 10^{-12}$ Aspheric surface coefficients of the image side surface (fifteenth surface) of the eighth lens are as follows.

$K=0.00$ $C4=7.987 \times 10^{-5}$ $C6=-3.354 \times 10^{-7}$ $C8=1.750 \times 10^{-8}$ $C10=-2.011 \times 10^{-10}$ $C12=9.573 \times 10^{-13}$ The variable interval D1 between the optical aperture stop AP and the fourth lens L4, and the variable interval D2 between the eighth lens L8 and the back insertion glass BG in Table 13 change as follows if the object distance changes to infinity and 250 mm.

TABLE 14

| Variable Interval | | |
|---|---|---|
| OBJECT DISTANCE | INFINITY | 200 mm |
| D1 | 4.18 | 3.66 |
| D2 | 16.3 | 18.1 |

The values corresponding to the conditional expressions (4)-(15) in Embodiment 7 are as follows.

$$f5/f6=-2.08 \quad [4]$$

$$F2/F=1.31 \quad [5]$$

$$L2/F=0.52 \quad [6]$$

$$\text{Log}|(D1_\infty-D1_t)/(D2_\infty-D2_t)\cdot t|=2.84 \quad [7]$$

$$f4_1/f4_2=-0.72 \quad [8]$$

$$|(R5+R2)/(R5-R2)|=1.90 \quad [9]$$

$$|(R8+R9)/(R8-R9)|=0.31 \quad [10]$$

$$f1/f3=-1.39 \quad [11]$$

$$|(R6+R7)/(R6-R7)|=0.28 \quad [12]$$

$$|f2/F|=2.5 \quad [13]$$

$$L/Y'=3.56 \quad [14]$$

$$d1_{2\text{-}3}/d1_{1\text{-}2}=0.01 \quad [15]$$

Accordingly, the values according to the above-described conditional expressions (4)-(15) in Embodiment 7 are within the ranges of the respective conditional expressions, and satisfy the conditional expressions (4)-(15).

Figure 14:
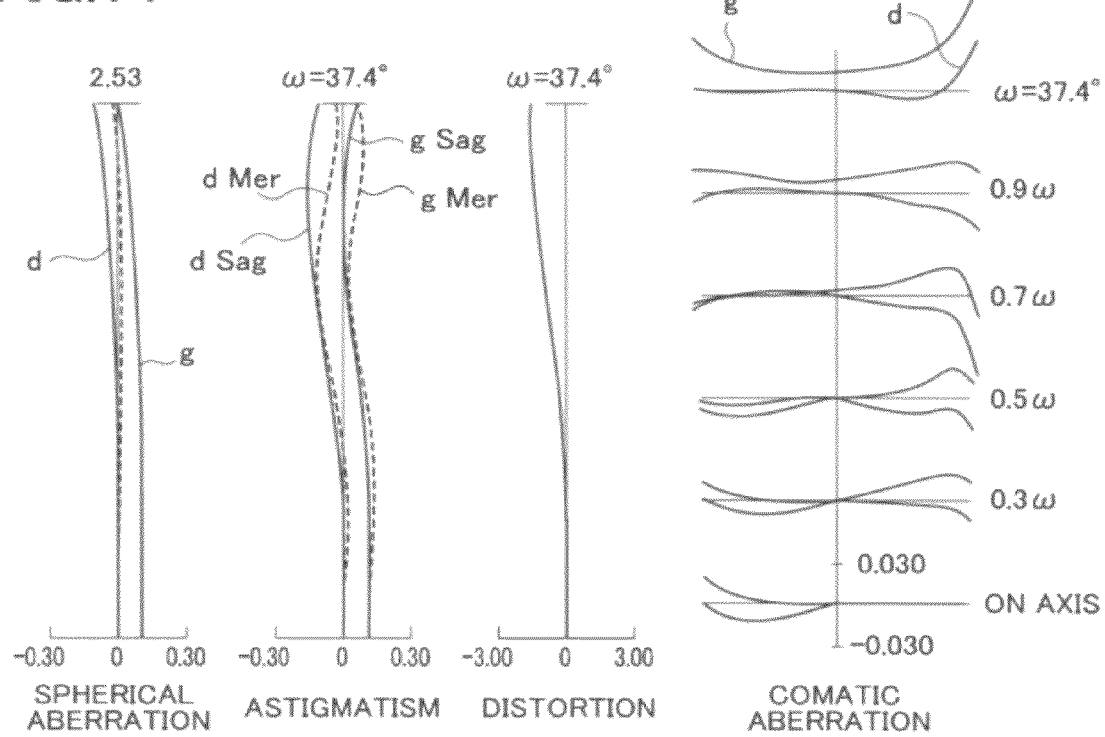
FIG. 14 provides aberration curves illustrating a spherical aberration, astigmatism, distortion and a comatic aberration in a state in which the imaging lens according to Embodiment 7 in FIG. 13 is focused on an infinity object.

FIG. 14 provides aberration curves of a spherical aberration, astigmatism, distortion and a comatic aberration in a state in which the imaging lens according to Embodiment 7 is focused on an infinite object.

Figure 15A:
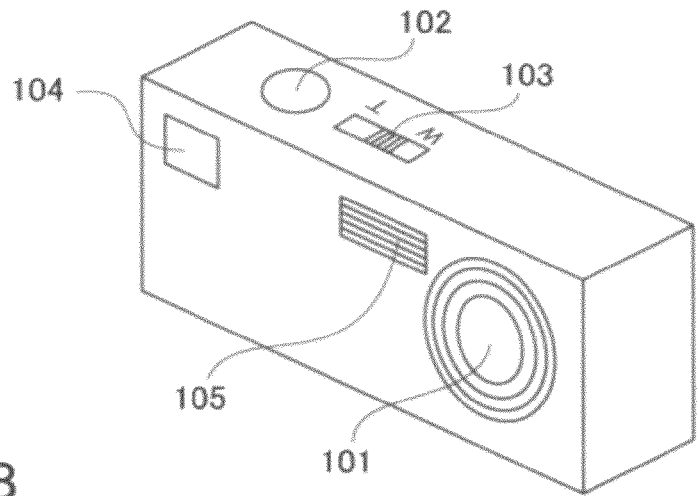
FIGS. 15A and 15B provide a perspective view as seen from an object side schematically illustrating an outer appearance of a digital camera as an imaging device according to one embodiment of the present invention.
Figure 15B:
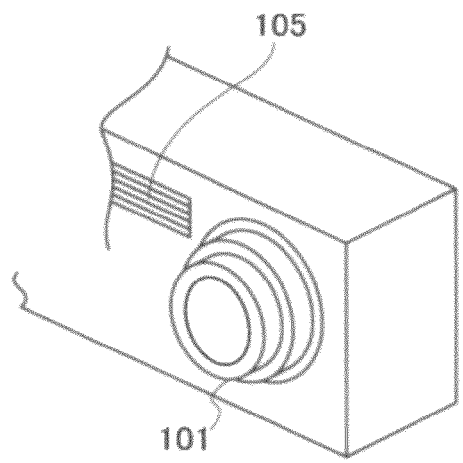
Figure 16:
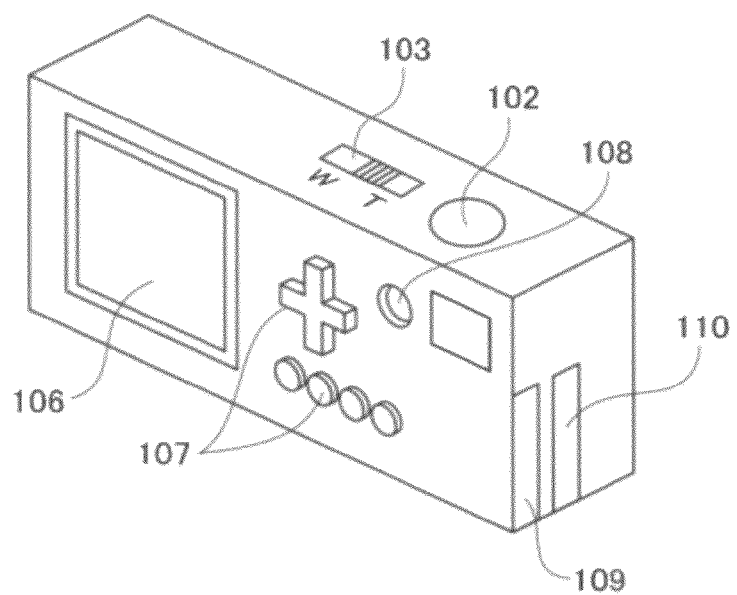
FIG. 16 provides a schematic view as seen from a photographer side schematically illustrating the outer appearance of the digital camera in FIG. 15.
Figure 17:
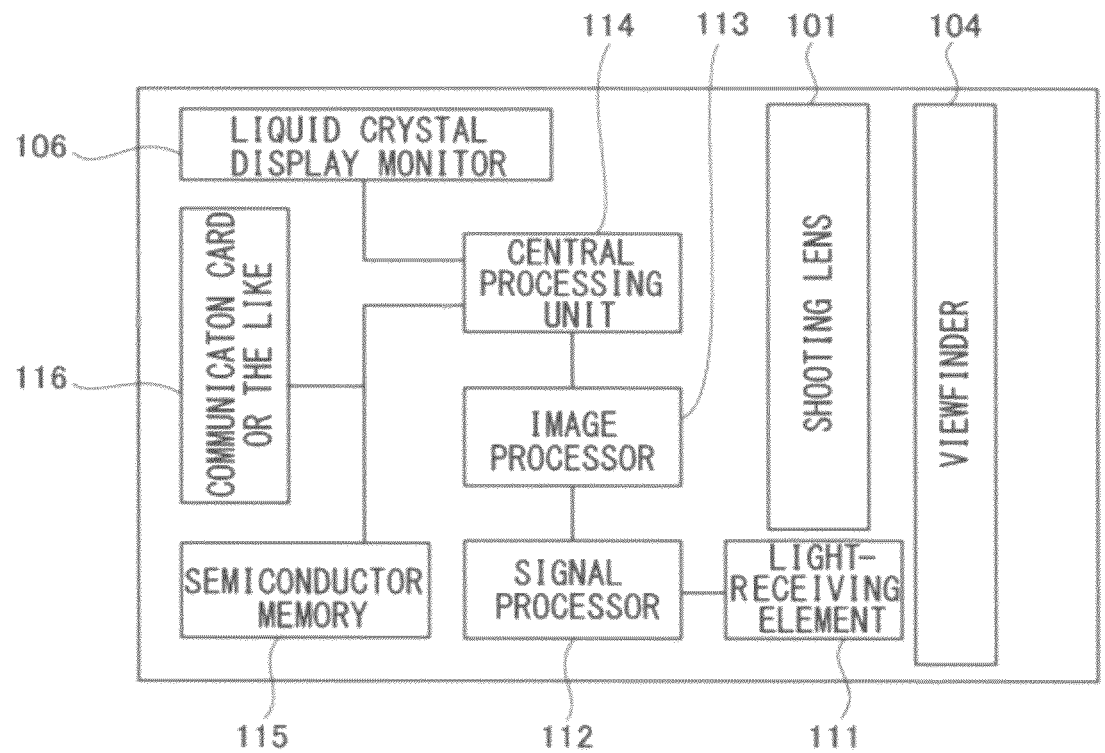
FIG. 17 is a block diagram schematically illustrating the functional configuration of the digital camera in FIGS. 15, 16.

An eighth embodiment describing an imaging device using the imaging lens illustrated in the above-described embodiments 1-7 as an imaging optical system, for example, a digital camera will be described with reference to FIGS. 15-17. FIGS. 15A, 15B are perspective views each illustrating an external appearance of a digital camera as seen from a front side, namely, an object side. FIG. 16 is a perspective view illustrating the external appearance of the digital camera as seen from the back side, namely, a photographer side. FIG. 17 is a block diagram illustrating the configuration of the digital camera. In addition, a digital camera is described as the imaging device in this embodiment, but an imaging function corresponding to a digital camera is incorporated into various information devices including a portable terminal device such as a smartphone and a portable information terminal device such as a cell phone or a PDA, not only in an imaging device including a video camera and a film camera. Such an information device includes functions and configurations which are the same as those in a digital camera although its appearance slightly differs, and the imaging lens can be used for such an information device.

As illustrated in FIGS. 15A, 15B, 16, the digital camera includes a shooting lens 101, a shutter button 102, a zoom lever 103, a finder 104, a strobe 105, a liquid crystal monitor 106, operation buttons 107, a power source switch 108, a memory card socket 109 and a communication card socket 110. As illustrated in FIG. 17, the digital camera includes a light-receiving element 111, a signal processor 112, an image processor 113, a central processing unit (CPU) 114, a semiconductor memory 115 and a communication card 116.

The digital camera includes the shooting lens 101 and the light receiving element 111 as an area sensor such as a CMOS or a CCD. An image of an object, namely a photographing subject formed by the imaging lens 101 of the optical system for imaging is read by the light-receiving element 111. As the shooting lens 101, the imaging lens according to Embodiments 1-7 is used.

The output of the light-receiving element 111 is processed by the signal processor 112 controlled by the CPU 114, and is converted into digital image information. After a predetermined image process is applied to the image information digitized by the single processor 112 in the image processor 113 which is controlled by the CPU 114, the image information is recorded in a semiconductor memory 115 such as a nonvolatile memory. In this case, the semiconductor memory 115 can be a memory card provided in the memory card socket 109, or can be a semiconductor memory built in the digital camera body. An image in shooting can be displayed on the liquid crystal monitor 106 or an image recorded in the semiconductor memory 115 can be displayed on the liquid crystal monitor 106.

The image recorded in the semiconductor memory 115 can be sent outside through the communication card 116 or the like provided in the communication card socket 110.

The shooting lens 101 is collapsed as illustrated in FIG. 16A in the body of the digital camera. If a user turns on the power source by operating the power source switch 108, the lens barrel extends as illustrated in FIG. 16B, and the lens barrel extends from the body of the digital camera. By operating the zoom lever 103, the digital zooming which changes magnification by changing the cut area of the subject image can be performed. In this case, it is preferable for the optical system of the finder 104 to change a magnification with the change in an effective field angle.

In many cases, by the half-pressing operation of the shutter button 102, the focusing is conducted.

If the shutter button 102 is further pressed to be fully pressed, the photographing is conducted, and the above-described process is performed.

When displaying an image recorded in the semiconductor memory 115 on the liquid crystal monitor 106, and sending outside via the communication card 116, the operation buttons 107 are used. The semiconductor memory 115, the communication card 116 and the like are used in a special or general socket such as the memory card socket 109 and the communication card socket 110.

When the photographing lens 101 is in a collapsed state, each group of the imaging lens is not necessary to be on the optical axis. For example, the second lens group G2 is retracted from the optical axis in the collapsed state, to be housed in parallel with the first lens group G1, so that the digital camera can be further downsized.

According to the above-described embodiments of the present invention, a small, wide-angle, bright and high-performance imaging lens in which aberrations are reduced can be achieved.

According to the above-described embodiments of the present invention, a small imaging device, which can perform high quality imaging while using a small, wide-angle, bright and high-performance optical system for imaging in which aberrations are reduced, can be achieved.

According to the above-described embodiments of the present invention, a small information device, which can perform high quality imaging while using a small, wide-angle, bright and high-performance optical system for imaging in which aberrations are reduced, can be achieved. Although the embodiments of the present invention have been described above, the present invention is not limited thereto. It should be appreciated that variations may be made in the embodiments described by persons skilled in the art without departing from the scope of the present invention.

What is claimed is:

1. An imaging lens comprising:
    an optical system including in order from an object side to an image side a first lens group having a positive refractive power and a second lens having a positive refractive power to image an optical image of an object,
    the first lens group and the second lens group being displaced in an extending amount different from one another to be focused on an object of a finite distance,
    the first lens group including a negative meniscus lens having a convex surface on the object side, a lens having a weak refractive power, and a lens having a positive refractive power, and
    the second lens group including four lenses or less or five lenses or less having at least one pair of a cemented lens, wherein
    a focal length f2 of a second lens from the object side in the first lens group, a focal length F of an entire lens system at infinity, an entire length L of the entire lens system at infinity and a maximum image height Y' satisfy the following conditional expressions $$5.0 < |f2/F| \quad [1]$$
    $$3.5 < L/Y' < 4.5 \quad [2].$$

2. The imaging lens according to claim 1, wherein an air interval $d1_{1-2}$ between a most object side lens and a lens next to the most object side lens in the first lens group and an air interval $d1_{2-3}$ between a second lens from the object side and the lens next to the second lens in the first lens group satisfy the following conditional expression $$0.4 < d1_{2-3}/d1_{1-2} < 3.5 \quad [3].$$

3. The imaging lens according to claim 1, wherein a distance L2 from a most object side surface to a most image side surface in the second lens group and the focal length F of the entire lens system at infinity satisfy the following condition $$0.4 < L2/F < 1.0 \quad [6].$$

4. The imaging lens according to claim 1, wherein a lens interval $D1_\infty$ between the first lens group and the second lens group when an object is at infinity, a lens interval $D1_t$ between the first lens group and the second lens group when focusing on an object of a finite distance, an interval $D2_\infty$ between the second lens group and an imaging surface when the object is at infinity, an interval $D2_t$ between the second lens group and the imaging surface when focusing on the object of a finite distance, and a distance t from a most object side surface of the first lens group to the object when the object is in a finite distance satisfy the following conditional expression (7) with Log as a common logarithm $$-3.3 < \mathrm{Log}\,|(D1_\infty - D1_t)/(D2_\infty - D2_t) \cdot t| < -2.7 \quad [7].$$

5. The imaging lens according to claim 1, wherein an aperture stop is arranged between the first lens group and the second lens group.

6. The imaging lens according to claim 1, wherein a most object side lens in the second lens group includes a positive refractive power and a second lens from the object side in the second lens group includes a negative refractive power,
    a focal length $f4_1$ of the most object side lens in the second lens group and a focal length $f4_2$ of the second lens from the object side in the second lens group satisfy the following conditional expression $$-0.8 < f4_1/f4_2 < -0.5 \quad [8].$$

7. The imaging lens according to claim 1, wherein a curvature radius R2 of an image side surface of a most object side lens in the first lens group and a curvature radius R5 of an object side surface of a most image side positive lens in the first lens group satisfy the following conditional expression $$1.5 < |(R5+R2)/(R5-R2)| < 5.5 \quad [9].$$

8. The imaging lens according to claim 1, wherein a curvature radius R8 of an image side surface of a most object side negative lens in the second lens group and a curvature radius R9 of an object side surface of a most image side negative lens in the second lens group satisfy the following conditional expression $$|(R8+R9)/(R8-R9)| < 0.5 \quad [10].$$

9. The imaging lens according to claim 1, wherein a focal length f1 of a most object side lens in the first lens group, and a focal length f3 of a most image side lens in the first lens group, or a focal length f3 of a cemented lens when the most image side lens is a cemented lens, satisfy the following conditional expression $$-1.7 < f1/f3 < -0.5 \quad [11].$$

10. The imaging lens according to claim 1, wherein
    a lens surface on a most object side in the second lens group includes a convex shape,
    a curvature radius R6 of an image side surface of a most image side lens in the first lens group and a curvature radius R7 of an object side surface of a most object side lens in the second lens group satisfy the following conditional expression $$|(R6+R7)/(R6-R7)| < 1.7 \quad [12].$$

11. An imaging device comprising the imaging lens according to claim 1 as an optical system for imaging.

12. An information device including an imaging function comprising the imaging lens according to claim 1 as an optical system for imaging.

13. An imaging lens comprising:
    an optical system including in order from an object side to an image side a first lens group having a positive refractive power and a second lens group having a positive refractive power to image an optical image of an object,
    the first lens group and the second lens group being displaced in an extending amount different from one another to be focused on an object of a finite distance,
    the first lens group including on a most object side a negative meniscus lens having a convex surface on the object side, and
    the second lens group including two lenses having a negative refractive power, and two lenses or more having a positive refractive power, among these, a most object side lens in the second lens group is a positive lens having a convex surface on the object side and a most image side lens in the second lens group is a positive lens having a convex surface on the image side, wherein
    a focal length f5 of a second lens from the image side in the second lens group, or a focal length f5 of a cemented lens when the second lens is a cemented lens, a focal length f6 of the most image side lens in the second lens group, a focal length F of an entire lens system at infinity and a focal length F2 of the second lens group satisfy the following conditional expressions $$-2.8 < f5/f6 < -0.8 \quad [4]$$
    $$1.0 < F2/F < 1.8. \quad [5].$$

14. The imaging lens according to claim 13, wherein a length L2 from a most object side surface to a most image side surface in the second lens group and the focal length F of an entire lens system at infinity satisfy the following conditional expression $$0.4 < L2/F < 1.0 \quad [6].$$

15. The imaging lens according to claim 13, wherein a lens interval $D1_\infty$ between the first lens group and the second lens group when an object is at infinity, a lens interval $D1_t$ between the first lens group and the second lens group when focusing on an object of a finite distance, an interval $D2_\infty$ between the second lens group and an imaging surface when the object is at infinity, an interval $D2_t$ between the second lens group and the imaging surface when focusing on the object of a finite distance, and a distance t from a most object side surface of the first lens group to the object when the object is in a finite distance satisfy the following conditional expression (7) with Log as a common logarithm $$-3.3 < \text{Log } |(D1_\infty - D1_t)/(D2_\infty - D2_t) \cdot t| < -2.7 \quad [7].$$

16. An imaging device comprising the imaging lens according to claim 13 as an optical system for imaging.

17. An information device including an imaging function comprising the imaging lens according to claim 13 as an optical system for imaging.

18. An imaging lens comprising:
   an optical system including in order from an object side to an image side a first lens group having a positive refractive power and a second lens group having a positive refractive power to image an optical image of an object,
   the first lens group and the second lens group being displaced in an extending amount different from one another to be focused on an object of a finite distance,
   the first lens group including a negative meniscus lens having a convex surface on the object side, a lens having a weak refractive power, and a lens having a positive refractive power, and
   the second lens group including five lenses or less having at least one pair of a cemented lens,
   a focal length f2 of a second lens from the object side in the first lens group, a focal length F of an entire lens system at infinity, a total length L of the entire lens system at infinity, a maximum image height Y', an air interval $d1_{1-2}$ between a most object side lens and a lens next to the most object side lens in the first lens group, and an air interval $d1_{2-3}$ between the second lens from the object side in the first lens group and a lens next to the second lens satisfy the following conditional expressions $$2.5 < |f2/F| \quad [13]$$

$$3.5 < L/Y' < 4.5 \quad [14]$$

$$d1_{2-3}/d1_{1-2} < 3.5 \quad [15].$$

19. An imaging lens comprising the imaging lens according to claim 18 as an optical system for imaging.

20. An information device having an imaging function comprising the imaging lens according to claim 18 as an optical system for imaging.

21. The imaging lens according to claim 1, wherein the first lens group includes at least one aspheric surface.

* * * * *